(12) United States Patent
Johnson et al.

(10) Patent No.: US 6,372,827 B2
(45) Date of Patent: Apr. 16, 2002

(54) SEALANT COMPOSITION, ARTICLE INCLUDING SAME, AND METHOD OF USING SAME

(75) Inventors: Michael A. Johnson, Stillwater; Clayton A. George, Afton; Robert J. Boettcher, Stillwater, all of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/895,722

(22) Filed: Jun. 29, 2001

Related U.S. Application Data

(62) Division of application No. 08/941,430, filed on Sep. 30, 1997, now Pat. No. 6,284,360.

(51) Int. Cl.[7] ............................................... C08L 63/00
(52) U.S. Cl. .................. 523/467; 524/558; 156/278; 156/280; 156/307.5; 156/309.6; 156/312; 156/313; 156/324.4
(58) Field of Search .................. 428/308.8, 314.4, 428/317.1, 317.7, 319.3, 426, 430, 457, 458; 523/467; 156/278, 280, 307.5, 312, 309.6, 313, 324.4; 524/558; 427/400, 208.2

(56) References Cited

U.S. PATENT DOCUMENTS

| | | |
|---|---|---|
| RE24,906 E | 12/1960 | Ulrich |
| 3,018,262 A | 1/1962 | Schoeder |
| 3,117,099 A | 1/1964 | Proops et al. |
| 3,542,619 A | 11/1970 | McManus |
| 3,574,024 A | 4/1971 | Rose |
| 3,645,817 A | 2/1972 | Walker et al. |
| 3,654,005 A | 4/1972 | Higgins et al. |
| 3,659,896 A | 5/1972 | Smith et al. |
| 3,704,196 A | 11/1972 | Callan |
| 3,708,385 A | 1/1973 | Immethun |

(List continued on next page.)

FOREIGN PATENT DOCUMENTS

| | | |
|---|---|---|
| BE | 890747 | 4/1982 |
| CA | 879910 | 8/1971 |
| CA | 2073092 | 4/1993 |
| DE | 36 38 449 A1 | 5/1988 |
| EP | 0 128 837 | 12/1984 |
| EP | 0 163 194 | 12/1985 |
| EP | 0 163 195 | 12/1985 |
| EP | 0 262 831 | 4/1988 |
| EP | 0 384 598 | 5/1990 |
| EP | 0 377 376 | 7/1990 |

(List continued on next page.)

OTHER PUBLICATIONS

International Search Report for PCT/US98/17856.
3M™ Scotch–Mount™ Brand # Y–4225 Acrylic Foam Tape Technical Data Sheet, Published prior to Sep. 30, 1997.

*Primary Examiner*—Helen L. Pezzuto
(74) *Attorney, Agent, or Firm*—Brian E. Szymanski; Steven E. Skolnick

(57) ABSTRACT

A multi-layer article which may be provided in the form of a tape comprises a conformable, compressible, melt flow-resistant core layer having first and second major surfaces, a sealant layer on the first major surface of the core layer, and optionally a bonding layer on the second major surface of the core layer. The sealant layer and the bonding layer each have a surface available for contacting a separate substrate. Various thermoset and foam core layers are disclosed as are thermosettable and thermoplastic sealant layers. The articles are useful for sealing two substrates together, particularly where one of the substrates is glass. Thus, the articles are especially adapted for sealing motor vehicle windshields to a frame. Various assemblies and methods for producing the same are also described.

7 Claims, 3 Drawing Sheets

U.S. PATENT DOCUMENTS

| | | |
|---|---|---|
| 3,755,066 A | 8/1973 | Rose |
| 3,756,881 A | 9/1973 | Denman |
| 3,767,503 A | 10/1973 | Maddalena |
| 3,787,351 A | 1/1974 | Olson |
| 3,816,234 A | 6/1974 | Winfield |
| 3,879,241 A | 4/1975 | Butler |
| 3,993,833 A | 11/1976 | Esmay |
| 4,113,905 A | 9/1978 | Kessler |
| 4,115,609 A | 9/1978 | Denman |
| 4,133,575 A | 1/1979 | Mader |
| 4,176,212 A | 11/1979 | Brack |
| 4,181,752 A | 1/1980 | Martens et al. |
| 4,184,000 A | 1/1980 | Denman |
| 4,223,067 A | 9/1980 | Levens |
| 4,401,537 A | 8/1983 | Chern et al. |
| 4,415,615 A | 11/1983 | Esmay et al. |
| 4,525,232 A | 6/1985 | Rooney et al. |
| 4,599,274 A | 7/1986 | Ando et al. |
| 4,645,146 A | 2/1987 | Hall |
| 4,695,501 A | 9/1987 | Robinson |
| 4,717,605 A | 1/1988 | Urban et al. |
| 4,748,061 A | 5/1988 | Vesley |
| 4,778,253 A | 10/1988 | Siga et al. |
| 4,822,683 A * | 4/1989 | Schappert et al. .......... 428/414 |
| 4,867,826 A | 9/1989 | Wayte |
| 4,879,853 A | 11/1989 | Braendle et al. |
| 4,882,001 A | 11/1989 | Gonzalez et al. |
| 4,908,273 A | 3/1990 | Urech et al. |
| 4,933,032 A | 6/1990 | Kunert |
| 4,964,362 A | 10/1990 | Dominguez |
| 4,986,867 A | 1/1991 | Braendle et al. |
| 4,994,315 A | 2/1991 | Schreiber et al. |
| 5,017,653 A | 5/1991 | Johnston |
| 5,049,439 A | 9/1991 | Robinson |
| 5,061,332 A | 10/1991 | Stolz et al. |
| 5,064,494 A | 11/1991 | Duck et al. |
| 5,082,736 A | 1/1992 | Bravet et al. |
| 5,086,088 A | 2/1992 | Kitano et al. |
| 5,089,536 A | 2/1992 | Palazzotto |
| 5,098,778 A | 3/1992 | Minnick |
| 5,120,379 A | 6/1992 | Noda et al. |
| 5,137,770 A | 8/1992 | Rothe et al. |
| 5,252,694 A | 10/1993 | Willett et al. |
| 5,304,623 A | 4/1994 | Ito et al. |
| 5,336,349 A | 8/1994 | Cornils et al. |
| 5,407,978 A | 4/1995 | Bymark et al. |
| 5,421,940 A | 6/1995 | Cornils et al. |
| 5,472,168 A | 12/1995 | Tapp |
| 5,494,707 A | 2/1996 | Wang et al. |
| 5,496,598 A | 3/1996 | Delisle et al. |
| 5,522,636 A | 6/1996 | Kolar, Jr. |
| 5,584,800 A | 12/1996 | Scholz et al. |
| 5,620,794 A | 4/1997 | Burkart et al. |
| 5,890,289 A | 4/1999 | Guillemet |
| 5,964,979 A * | 10/1999 | George et al. ........... 156/309.6 |

FOREIGN PATENT DOCUMENTS

| | | |
|---|---|---|
| EP | 0 382 602 | 8/1990 |
| EP | 0 402 254 | 12/1990 |
| EP | 0 665 250 | 8/1995 |
| FR | 2173318 | 10/1973 |
| FR | 2201184 | 4/1974 |
| GB | 2086263 | 5/1982 |
| JP | 7-278507 | 10/1995 |
| JP | 08157781 A | 6/1996 |
| JP | 08157782 A | 8/1996 |
| JP | 08309863 | 11/1996 |
| JP | 08319462 | 12/1996 |
| JP | 08319463 | 12/1996 |
| WO | WO 94/18255 | 11/1994 |

* cited by examiner

SEALANT COMPOSITION, ARTICLE INCLUDING SAME, AND METHOD OF USING SAME

This is a divisional of application Ser. No. 08/941,430 filed Sep. 30, 1997, now U.S. Pat. No. 6,284,360.

BACKGROUND OF THE INVENTION

This invention relates to establishing a seal between two substrates, particularly where at least one of the substrates is glass.

Many applications exist where it is necessary to secure a glass substrate within a frame such as a metal, plastic or wood frame, which may be painted. For example, glass windshields are secured within the metal or plastic frame of a motor vehicle both during vehicle manufacture and following manufacture to replace the windshield in the event that it cracks or breaks.

It is difficult to establish a strong bond to glass using conventional sealants and adhesives such as polyurethane pastes. To enhance adhesion, the glass surface is typically primed prior to inserting it into the frame.

Polyurethane pastes are conventionally used to establish a seal between the primed glass and the frame. Such pastes, however, are difficult to apply uniformly and reproducibly. Another problem is that pushing the glass into the frame causes the paste to flow and squeeze out of the bond line. This creates bond lines of uneven thickness and glass-frame contact points that can act as failure points because any stress applied to the frame is transmitted directly to the glass at these points. This is particularly a problem when a motor vehicle windshield is installed into a frame that has a highly uneven surface. To address this problem, discontinuous "spacers" are typically placed at various points around the perimeter of the frame. While these spacers help avoid creating glass-frame contact points, they also act as stress concentration points because while the sealant shrinks during cure, the spacers do not. It is then necessary to use extra sealant to accommodate the spacers.

Another problem is encountered in the case of polyurethane sealant pastes that require a relatively long time to cure and build bond strength such as those which are moisture-curable. During this vulnerable curing period, the glass can vibrate within the frame, making the seal and the glass susceptible to damage. Gaps in the seal can form, giving rise to wind noise and compromising seal integrity. The noise associated with the vibrations is also undesirable. Moreover, the reliance on ambient moisture means that the cure process varies depending upon ambient conditions.

SUMMARY OF THE INVENTION

In a first aspect, the invention features an article (e.g., in the form of a tape) that includes (a) a conformable, compressible, melt flow-resistant foam core layer having first and second major surfaces, and (b) a thermosettable sealant layer on said first major surface of the core layer. The sealant layer has a surface available for contacting a substrate.

A "sealant composition" or a "sealant layer" is a gap-filling material. Consequently, at the time of seal formation, sealant compositions according to the invention have an elasticity that is sufficiently low such that the sealant composition is able to flow into and fill gaps in the substrate to which it is applied and, after the sealant has cured (in the case of thermosetting sealant compositions) or solidified upon cooling (in the case of thermoplastic sealant compositions), still sufficiently fill the gaps so as to seal the substrate. Both the surface of the sealant layer available for contacting a substrate and the bulk composition of the sealant layer meet these criteria. Sealant compositions useful in the invention are non-tacky (i.e., they are not tacky to the touch) once they have cured (in the case of thermosetting sealant compositions) or solidified upon cooling (in the case of thermoplastic sealant compositions).

In addition, the sealant compositions do not meet the definition of a pressure sensitive adhesive as established by the Pressure Sensitive Tape Council (PSTC), Glenview, Ill. According to the PSTC Glossary of Terms (August, 1985 revision), pressure sensitive adhesives are aggressively and permanently tacky at room temperature and firmly adhere to a wide variety of dissimilar surfaces upon mere contact and without the need for more than finger or hand pressure. They require no activation by water, solvent or heat in order to exert a strong adhesive holding force toward materials such as paper, plastic, glass, wood, cement and metals. They have a sufficiently cohesive holding and elastic nature so that, despite their aggressive tackiness, they can be handled with the fingers and removed from smooth surfaces without leaving a residue.

A "'thermosetting" or "thermosettable" composition is one which can be cured (i.e., crosslinked), for example by exposure to, preferably, heat or actinic radiation (although exposure to moisture or other chemical means may also suffice), to yield a substantially infusible (i.e., thermoset) material. Combinations of these various curing means may also be used (e.g., a combination of heat and actinic radiation). Such compositions may include a curing agent (e.g., a thermal or photo-active curing agent).

A "thermoplastic" composition is one which is capable of being repeatedly softened by heat and hardened by cooling.

A "melt flow-resistant" material is a material that resists undergoing macroscopic mass flow under conditions at which the sealant layer exhibits macroscopic flow. Typically, the melt flow-resistant material resists undergoing macroscopic mass flow when subject to temperatures of up to about 200° C.

A "conformable, compressible" material is a material that readily deforms when subjected to an applied stress, but will tend to elastically recover when the stress is removed within the time frame that it takes to establish a seal between two substrates of interest, although some permanent set or deformation may occur depending on the stress to which the material is subjected in a given application.

In one embodiment, the thermosettable sealant layer includes a blend of (a) an epoxy resin, (b) a resin selected from the group consisting of polyacrylates, semi-crystalline polyesters, and combinations thereof, and (c) a curing agent selected from the group consisting of (i) thermally activated curing agents characterized by a thermal activation temperature and (ii) photo-active curing agents characterized by a thermal decomposition temperature.

In another embodiment, the thermosettable sealant layer substantially retains its shape when heated to a temperature greater than the softening temperature of the composition, but less than about 200° C., until acted upon by an external force other than gravity. Such force includes the pressure exerted during sealing by pushing two substrates together. One test for determining whether a given composition exhibits this behavior involves placing a sample of the composition on a plate maintained at an angle in an oven, heating the sample to the desired temperature, and observing the extent to which the sample loses its initial shape and flows down the surface of the plate within a set period of time. Because the test is conducted in the absence of an applied external force, any such flow is attributable to the combined effect of temperature and gravity alone. This test is described in greater detail in the "Examples" section below.

In another embodiment, the sealant layer includes a thermosetting sealant composition that includes a curing agent selected from the group consisting of (a) thermally activated curing agents characterized by a thermal activation temperature, and (b) photo-active curing agents characterized by a thermal decomposition temperature. The sealant composition is characterized in that, prior to cure, the composition substantially retains its shape when heated to a temperature greater than the softening temperature of the composition, but less than (a) the thermal activation temperature of the curing agent, where the curing agent is a thermally activated curing agent, or (b) the thermal decomposition temperature of the curing agent, where the curing agent is a photo-active curing agent, until acted upon by an external force other than gravity, measured according to the test procedure generally described above.

An example of a preferred sealant composition includes a blend of an epoxy resin, a semi-crystalline polyester, and a curing agent selected from the group consisting of (a) thermally activated curing agents characterized by a thermal activation temperature, and (b) photo-active curing agents characterized by a thermal decomposition temperature. The sealant composition is characterized in that, prior to cure, the sealant composition substantially retains its shape when heated to a temperature greater than the melting temperature of the polyester but less than (a) the thermal activation temperature of the curing agent, where the curing agent is a thermally activated curing agent or (b) the thermal decomposition temperature of the curing agent, where the curing agent is a photo-active curing agent, until acted upon by an external force other than gravity, measured according to the test procedure generally described above. Preferably, this sealant composition substantially retains its shape when heated to a temperature greater than the melting temperature of the polyester, but less than about 200° C., until acted upon by an external force other than gravity.

The core layer preferably has a tensile strength no greater than the tensile strength of the sealant layer. Examples of suitable core layers include foams, which may be open or closed cell foams, although closed cell foams are preferred. Examples of suitable foams include polyacrylic, polyurethane and polyolefin foams. Also useful are core layers in the form of pressure sensitive adhesives, e.g., pressure sensitive adhesive foams.

The article may further include a bonding layer provided on the second major surface of the core layer. In such embodiments, the sealant layer and the bonding layer preferably are thermally insulated from each other.

In a second aspect, the invention features an article that includes (a) a conformable, compressible, melt flow-resistant thermoset core layer having first and second major surfaces, and (b) a thermosettable sealant layer on said first major surface of the core layer. The sealant layer has a surface available for contacting a substrate. The thermoset core layer may be provided by, for example, a closed cell foam or a pressure sensitive adhesive. Useful thermosettable sealant layers include those which were described above.

In a third aspect, the invention features an article that includes (a) a conformable, compressible, melt flow-resistant core layer having first and second major surfaces, and (b) a thermoplastic sealant layer on said first major surface of the core layer. The sealant layer has a surface available for contacting a substrate and is formed from a thermoplastic polymer selected from the group consisting of polyurethanes, polyesters, polyaromatic-containing block copolymers, and silicones. Useful core layers include those previously described.

In a fourth aspect, the invention features an article comprising (a) a conformable, compressible, melt flow-resistant thermoset core layer having first and second major surfaces, (b) a sealant layer on said first major surface of said core layer and having a surface available for contacting a substrate, and (c) a thermosettable bonding layer on said second major surface of said core layer and having a surface available for contacting a second substrate. Useful core and sealant layers include those materials previously mentioned.

In a fifth aspect, the invention features an article that includes (a) a substrate having a first major surface and a second major surface separated by an edge region having a finite thickness; (b) a conformable, compressible, melt flow-resistant core layer having first and second major surfaces; and (c) a thermosettable sealant layer provided on the first major surface of the core layer and having a surface available for contacting a second substrate. Examples of suitable core and sealant layers include the materials described above. The core layer is affixed at its second major surface to (i) the first major surface of the substrate and/or (ii) the edge region of the substrate. The core layer imparts vibration damping properties to the article.

The invention also features a method for joining these articles to a second substrate by contacting the sealant layer with the second substrate to join the second substrate to the first substrate through the sealant layer.

An example of a preferred substrate is glass, e.g., a glass windshield adapted for use in a motor vehicle. Such substrates can be joined to, e.g., metal substrates, painted substrates (e.g., painted metal substrates), and, in the case of windshields, frames of the type found in motor vehicles. Higher surface energy substrates are particularly usefully joined to each other. Another example of a second substrate is a U-shaped bracket into which the sealant-bearing article can be placed.

In one embodiment, particularly useful in the case of windshields or substrates installed in grooves, the first major surface of the substrate is characterized by a first perimeter, the second major surface of said substrate is characterized by a second perimeter, and the core layer is affixed at its second major surface to (i) the first major surface of the substrate such that the core layer extends substantially around the entire perimeter of the first major surface of the first substrate, and/or (ii) the edge region of the substrate such that the core layer substantially surrounds the edge region.

In a sixth aspect, the invention features an article that includes (a) a substrate having a first major surface characterized by a first perimeter and a second major surface characterized by a second perimeter, in which the first and second surfaces are separated by an edge region having a finite thickness; (b) a conformable, compressible, melt flow-resistant core layer having first and second major surfaces; (c) a sealant layer provided on the first major surface of the core layer; and (d) a second substrate joined to the first substrate through the sealant layer. The core layer is affixed at its second major surface to (i) the first major surface of the first substrate such that the core layer extends substantially around the entire perimeter of the first major surface of the first substrate, and/or (ii) the edge region of the substrate such that the core layer substantially surrounds the edge region. The core layer imparts vibration damping properties to the article. Examples of suitable core and sealant layers include the materials described above.

In one preferred embodiment, the first substrate includes glass and the second substrate includes metal. In a second preferred embodiment, the first substrate includes glass and the second substrate includes a painted substrate (e.g., a painted metal substrate). In one particularly preferred embodiment, the first substrate is a glass windshield and the second substrate is a frame (e.g., formed in a motor vehicle) for supporting the windshield.

In a seventh aspect, the invention features a sealant composition that includes a blend of an epoxy resin, a semi-crystalline polyester, and a curing agent selected from the group consisting of (a) thermally activated curing agents characterized by a thermal activation temperature, and (b) photo-active curing agents characterized by a thermal decomposition temperature. The sealant composition is characterized in that, prior to cure, the composition substantially retains its shape when heated to a temperature greater than the melting temperature of the polyester but less than (a) the thermal activation temperature of the curing agent, where the curing agent is a thermally activated curing agent, or (b) the thermal decomposition temperature of the curing agent, where the curing agent is a photo-active curing agent, until acted upon by an external force other than gravity, measured according to the test procedure described generally above.

In preferred embodiments, the sealant composition further includes a thixotropic agent, e.g., selected from the group consisting of particles (such as silica particles), chopped fibers, bubbles (such as glass, ceramic or polymeric bubbles), and combinations thereof Prior to cure, the composition preferably substantially retains its shape when heated to a temperature greater than the melting temperature of the polyester, but less than about 200° C., until acted upon by an external force other than gravity.

The invention provides an easy-to-use sealant in the form of an article such as a tape for establishing a seal between two substrates that is particularly useful where at least one of the substrates is glass. The sealant and one of the substrates may be provided in the form of a single, ready-to-use article. The sealant can be applied uniformly and consistently, and does not excessively squeeze out when the substrate is pushed into a frame. Thus, clean-up following the sealing operation is simplified. The sealants may also be used without a primer.

Once placed between two substrates the preferred sealants build strength quickly, resulting in a seal having good green strength. Thus, it minimizes or eliminates the need for special precautions to support one, or both, of the substrates during the sealing operation. The rapid build-up of strength also eliminates problems relating to stresses imposed on the substrate prior to full cure such as may be caused by movement of the substrate relative to the frame. Thus, for example, in the case of windshield installation, it is possible to drive away in the vehicle bearing the newly installed windshield before cure is complete.

The ability to build green strength rapidly, coupled with the ability to eliminate processing steps such as priming and cleaning up excess sealant squeezed out of the bond line, simplifies the sealing process. This, in turn, facilitates use of the sealants in a motor vehicle assembly line. In addition, this imparts greater flexibility to the motor vehicle assembly process. For example, instead of installing the windshield early in the manufacturing process to allow time for sealant cure before the vehicle is driven off the manufacturing line, it becomes possible to install the windshield late in the manufacturing process.

The preferred sealants can be stored for extended periods of time without degrading because cure does not commence until the composition is exposed to heat or actinic radiation. Advantageously, the preferred heat- or actinic radiation-curable sealants cure relatively independently of ambient conditions that could limit the utility of temperature- and humidity-sensitive materials such as moisture-curable sealants.

Following cure, the sealant forms a tough, ductile material having good tensile strength. Thus, it maintains a good seal between the substrate and the frame even when the seal is subjected to ambient moisture and stress, e.g., of the type encountered during motor vehicle use. In addition, the sealant exhibits low shrinkage upon cure, thereby maintaining the seal and minimizing stress to the substrate. Particularly in the case of glass substrates, such stresses can cause the glass to crack.

The compressible, conformable core layer acts as an integral bond line spacer and forms a vibration damping cushion on which the substrate floats within the frame.

Because it preferably is substantially continuous around the perimeter of the substrate surface, it can advantageously accommodate and dissipate stresses to which the article is subjected under normal use conditions. An additional advantage is that the preferred constructions, under high shear rate catastrophic impact, may transmit the imposed stress to the substrates. In addition, the compressible, conformable property of the core layer allows for greater sealing capacity, thus reducing the amount of sealant needed and minimizing squeeze out.

Other features and advantages will be apparent from the following description of the preferred embodiments thereof, and from the claims.

BRIEF DESCRIPTION OF THE DRAWINGS

The invention will be more fully understood with reference to the following drawings in which similar reference numerals designate like or analogous components throughout and in which.

DETAILED DESCRIPTION OF THE PREFERRED EMOBDIMENTS

Article

Figure 1:
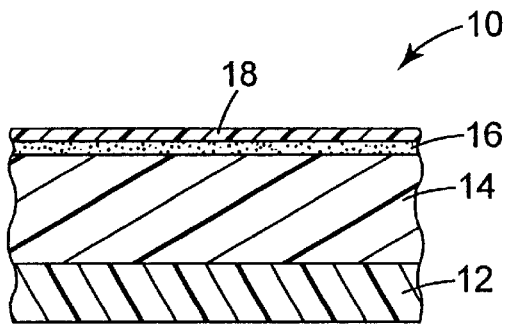
FIG. 1 is an enlarged, fragmentary, cross-sectional view of a multi-layer article according to the invention.

FIG. 1 illustrates a multi-layer article 10 in the form of a tape useful for establishing a seal between two substrates. Tape 10 features a sealant layer 12, a core layer 14, an optional bonding layer 16, and an optional, temporary, removable liner 18 for protecting the bonding layer (if present) or the core layer. Liner 18 is removed prior to attaching the surface that it protects to a substrate. Alternatively, optional bonding layer 16 may be replaced by an optional, second sealant layer.

Conveniently, though not shown separately in the drawings, tape 10 may be provided in the form a roll of tape for easy storage, shipping, handling and use. In such constructions, tape 10 is typically wound about a paper or plastic core having a diameter, conventionally, of about 7.6 centimeters. In such constructions, the tape may be wound up with a temporary, removable liner that separates adjacent windings in the roll. The provision of tape 10 in roll form is facilitated by selecting the sealant layer to have a thickness and a modulus that promotes easy wind-up without exerting a force that could result in permanent deformation of core layer 14 in the article, oozing of any of the layers in the article beyond the widest layer in the article, or telescoping of the article, when stored under ordinary, ambient conditions of temperature and humidity.

Tape 10 can be used to seal a variety of substrates together. The substrates may be the same as, or different from, each other. Examples of suitable substrates include glass, metal, plastic, wood, and ceramic substrates. Representative plastic substrates include polyvinyl chloride, ethylene-propylene-diene monomer rubber, polyurethanes, polymethyl methacrylate, engineering thermoplastics (e.g., polyphenylene oxide, polyetheretherketone, polycarbonate), and thermoplastic elastomers, including thermoplastic elastomeric olefins. Glass, and polymers which may be used as substitutes for glass (e.g., polycarbonate and polymethyl methacrylate), may be referred to as glazing materials. Tape 10 is particularly effective in sealing substrates that have a higher surface energy (as measured by a Zisman critical wetting tension greater than 35 millijoules/m$^2$) such as metal, painted metal and many polymers. The surface of the substrate may be coated, e.g., with paint, an abrasion-resistant coating, or an anti-glare coating. In the case of, e.g., windshields, the glass may include a ceramic-frit layer.

Tape 10 is particularly useful for sealing glass substrates to, e.g., metal and plastic substrates. For example, article 10 is particularly useful for sealing a glass windshield to a metal or plastic frame in a motor vehicle.

Core layer 14 supports sealant layer 12. One purpose of core layer 14 is to act as an integral spacer when tape 10 is used to establish a seal between a pair of substrates. Thus, during pressurized application of the tape-bearing substrate to the other substrate, core layer 14 prevents the two substrates from coming together in the event that the sealant is displaced. Such contact is particularly undesirable where one of the substrates is glass because the resulting stress can cause the glass to break. Core layer 14 also dissipates stress resulting from cure of the sealant, thereby minimizing stress in the seal.

Core layer 14 also preferably acts as an internal vibration damper to minimize noise associated with variable frequency substrate movement once the two substrates have been sealed together. The core layer also isolates the substrate to which it is affixed from stresses transmitted to that substrate and from the other substrate. For example, in the case of a glass windshield installed in a motor vehicle, the core layer damps vibrations arising from wind impinging on the glass, as well as vibrations arising from the motor vehicle frame.

Another function of core layer 14 is to thermally insulate sealant layer 12 from bonding layer 16, regardless of whether the bonding layer is integral with tape 10, or applied separately to the substrate surface prior to application of the tape. In this way, the respective curing reactions that may take place in the sealant and bonding layers can be isolated from each other, affording the opportunity to cure the tape in stages. It also offers the advantage of increasing formulation freedom with respect to the compositions of the sealant and bonding layers.

Yet another function of core layer 14 is to act as a failure zone such that cohesive failure of the tape (as opposed to failure at a tape/substrate interface) preferentially occurs in the core layer, rather than the sealant layer or the bonding layer (if present). This feature is particularly advantageous when bonding glass substrates such as windshields to a metal or plastic frame in a motor vehicle because it ensures that adhesive bonds between the glass and the tape, and between the tape and vehicle, remain intact when subject to stress, thereby enhancing overall performance.

To achieve these functions core layer 14 is designed to be compressible and conformable. These features enable core layer 14, for example, to cushion the substrate to which the tape is affixed, and to absorb and distribute stress applied to the sealed construction. In addition, compressibility and conformability aid in achieving complete body contact and seal formation.

Core layer 14 is also designed to be melt-flow resistant such that it does not undergo macroscopic mass flow when exposed to the temperatures and pressures used during the sealing operation.

To promote cohesive failure of tape 10, core layer 14 is preferably formulated to be weaker than either the sealant layer or the bonding layer (if present). That is, the ultimate tensile strength of the core layer is no greater than the ultimate tensile strength of either the sealant layer or the bonding layer (if present) so as to encourage cohesive failure within the core layer. For example, the ultimate tensile strength of the core layer is preferably no greater than about 80% of the ultimate tensile strength of either the sealant layer or the bonding layer, as measured according to the test procedure described in the "Examples" section below. "Ultimate tensile strength" refers to the tensile strength as measured under the temperature and humidity conditions specified in the "Examples" section below and after any individual thermosettable layers within the tape have cured.

Typically, core layer 14 has an ultimate tensile strength no greater than about 6.9 MPa, preferably no greater than about 5.2 MPa, and more preferably no greater than about 3.5 MPa, measured according to the test procedure described in the "Examples" section below. The particular maximum tensile strength value is a function of the application for which tape 10 is designed to be used. For example, in the case of windshields installed in motor vehicles, the ultimate tensile strength of the core layer preferably is no greater than about 3.5 MPa.

To further localize cohesive failure in the core layer, a tie layer (not shown separately in the drawings) may be disposed between the sealant layer and the core layer to enhance adhesion between the two layers. A second tie layer (also not shown separately in the drawings) may be similarly disposed between the core layer and the bonding layer (if present). Enhancing adhesion between the individual layers increases the likelihood that the failure mode will be cohesive failure in the core rather than failure at a tape/substrate interface.

Useful materials for the tie layer include, for example, polymeric films, pressure-sensitive adhesives, pressure-activated adhesives, heat activated adhesives, and the like, any of which may be latently curable or not. Often, the choice of tie layer is based upon the composition of the respective layers. For example, in the case of core and sealant layers having acid functional groups, thermoplastic polyamides are useful tie layers. In the case of epoxy-containing sealant layers and acrylic-based cores, waterborne dispersions of a blend of an epoxy and a polyamide are useful. Such dispersions are commercially available from Union Camp Corp., Wayne, N.J. under the designation Micromid™ 142LTL. Other methods for enhancing adhesion between the individual layers of tape 10 include providing the core layer with functional groups, such as carboxylic acid groups, to enable the core layer to bond covalently to the sealant layer, the bonding layer, or both. The surface of the core layer may also be treated, e.g., by corona discharge, to enhance adhesion to adjoining layers.

The thickness of core layer 14 must be sufficient for the core layer to perform the bond line spacing function and, preferably, the vibration damping and thermal insulation functions as well. The particular thickness of a given core layer is selected based upon the application for which tape 10 is intended. For example, in the case of motor vehicle windshield installation, the thickness of the core layer must be small enough such that the tape can fit within the frame for which the windshield is designed. Typically, the thickness of core layer 14 is at least about 1 mm preferably at least about 2 mm, and more preferably at least about 3 mm.

Preferred materials for core layer 14 are viscoelastic materials. These materials may be thermoplastic or thermoset, with thermoset materials being preferred. Examples of suitable materials for core layer 14 include thermoset materials such as polyacrylates and polyurethanes, and thermoplastic materials such as ethylene-vinyl acetate copolymers. An example of a suitable, commercially available material is sold by 3M Company under the designation Structural Bonding Tape No. 9214.

Polyurethane-based core layers can be provided as solid elastomers or as cellular foams and may be formed from one- or two-part compositions. One-part compositions can be moisture-activated, in which case water, either purposefully introduced or acquired from the atmosphere, initiates the curing reaction. Alternatively, a blocked isocyanate may be used with heat being employed to unblock the isocyanate and initiate the curing reaction. Two-part urethanes include a first component that contains one or more isocyanate-based resins and second component that contains one or more polyols and curatives.

Also suitable are pressure sensitive adhesives. Such adhesives allow the free ends of tape 10 to be fused together in the form of a joint to yield a continuous seal, preferably a joint in which the tape ends remain in the same plane such as a side-to-side joint, scarf joint, or butt joint. In addition, when core layer 14 is in the form of a pressure sensitive adhesive, it is possible to bond the core layer directly to the substrate, thereby eliminating the need for a separate bonding layer (integral or otherwise).

Preferably, core layer 14 is in the form of a foam, with thermoset acrylic foams being particularly preferred. The foam may have an open or closed cell structure, although closed cell foams are preferred. Examples of suitable foams are described, for example, in Levens, U.S. Pat. No. 4,223,067, and Esmay et al., U.S. Pat. No. 4,415,615. Polyethylene and ethylene vinyl acetate-based foams may also be used and are typically produced by extruding a resin composition from an extruder and foaming the material before or after crosslinking. Commercial suppliers for these types of foam include Voltek Div. of Sekisui America Corp., Lawrence, Mass. or Sentinel Products Corp., Hyannis, Mass.

Other materials that can be incorporated into core layer 14 include, for example, stabilizers, antioxidants, plasticizers, tackifiers, flow control agents, adhesion promoters (e.g., silanes and titanates), colorants, thixotropes, and other fillers.

Sealant layer 12 is preferably in the form of a continuous layer. However, discontinuous layers may also be used as long as the sealant fuses under the application of heat and pressure to form an effective seal in the final article. To aid in achieving a good seal to irregular surfaces, the surface of sealant layer 12 available for sealing to the second substrate may be textured. In addition, both single and multi-layer sealant compositions are envisioned.

Sealant compositions useful in the invention are non-tacky (i.e., they are not tacky to the touch) once they have cured (in the case of thermosetting sealant compositions) or solidified upon cooling (in the case of thermoplastic sealant compositions). In order to facilitate the provision of such compositions and to facilitate the manufacture and handling of tape 10 when it is in the form of a tape roll, it is preferred that the sealant composition have a room temperature (i.e., about 23° C.) shear modulus of at least about $3 \times 10^6$ dynes/$cm^2$, more preferably about $10^7$ to $10^{10}$ dynes/$cm^2$, when measured at a frequency of 1 hertz.

The width of sealant layer 12 is application-dependent. In general, however, the width of sealant layer 12 is no greater than the width of core layer 14.

The purpose of sealant layer 12 is to establish and maintain a seal between a pair of substrates. The sealant is designed to have a relatively high ultimate tensile strength following cure (in the case of thermosettable materials) or upon cooling (in the case of thermoplastic materials), without being brittle, to promote localized failure in the core layer. The particular minimum tensile strength value is application-dependent. In general, however, tensile strengths are on the order of at least about 3.5 MPa, preferably at least about 5.2 MPa, and more preferably at least about 6.9 MPa when measured according to the test procedure described in the "Examples" section below. For example, in the case of windshields installed in motor vehicles, the ultimate tensile strength of the sealant layer preferably is greater than about 3.5 MPa.

After causing the sealant composition to flow and form a seal (e.g. by applying heat and/or pressure), the sealant layer 12 is preferably designed to build cohesive strength rapidly, resulting in a construction having good green strength. One measure of the rate at which strength builds is the overlap shear adhesion of the sealant layer relative to the core layer, as measured according to the test procedure described in the "Examples" section below. Preferably, the overlap shear adhesion of the sealant layer is greater than the overlap shear adhesion of the core layer within about 30 minutes following the initial application of heat and pressure, more preferably within about 15 minutes, and even more preferably within about 5 minutes. Of course, the sealant composition also needs to exhibit adequate adhesion to the substrate surface that it is intended to seal, recognizing that the desired adhesion may be application dependent. This may be reflected by a shear adhesion value of preferably at least about 25 psi, more preferably at least about 50 psi, and most preferably at least about 100 psi. In certain applications, however, higher values such as at least about 300 psi, more preferably at least about 500 psi, or even more preferably at least about 700 psi may be desirable. Such values refer to the measurement of shear adhesion at ajaw separation rate of 50.8 mm/minute when an approximately 1 mm thick sealant layer is placed between an approximately 0.9 mm thick E-coated steel substrate (i.e., using ED-5100 coated panels as obtained from Advanced Coating Technlogies Inc., Hillsdale, Mich.), and an anodized aluminum substrate as obtained from Hiawatha Panel & Name Plate Co., Inc., Minneapolis, Minn.

The thickness of sealant layer 12 is a function of the particular sealing application for which article 10 is intended. Typically, however, the thickness of sealant layer 12 is at least about 0.25 mm, preferably at least about 1 mm, and more preferably at least about 1.5 mm, which thicknesses are also useful in providing article 10 in the form of a roll of tape. In some applications, the relative thicknesses of core layer 14 and sealant layer 12 may influence the performance of the multi-layer article since the compressive force exerted by the core layer on the sealant layer can contribute to the formation of a good seal to the substrate. Consequently, it may be desirable in some instances for the thickness of sealant layer 12 to be at least 30% of the thickness of core layer 14, more preferably at least 50% of the thickness of the core layer.

Melt-flowable compositions may be used for sealant layer 12. Suitable compositions include thermosettable materials such as epoxy resins, or the combination of such materials with thermoplastic materials to form miscible or physical blends. Examples of such blends are described, e.g., in Johnson et al., "Melt-Flowable Materials and Method of Sealing Surface," filed Apr. 12, 1995 and bearing Ser. No. 08/421,055, which is assigned to the same assignee as the present application and hereby incorporated by reference, and (b) Kitano et al., U.S. Pat. No. 5,086,088, also incorporated by reference.

One suitable class of materials includes blends of epoxy resins with semi-crystalline polymers such as polyesters, as described in the aforementioned Johnson et al. application. Semi-crystalline polymers are advantageous because they contribute to rapid build-up of sealant strength, leading to a seal having a high green strength.

A polymer that is "semi-crystalline" displays a crystalline melting point, as determined by differential scanning calorimetry (DSC), preferably with a maximum melting point of about 200° C. Crystallinity in a polymer is also observed as a clouding or opacifying of a sheet that had been heated to an amorphous state as it cools. When the polymer is heated to a molten state and knife coated onto a liner to form a sheet, it is amorphous and the sheet is observed to be clear and fairly transparent to light. As the polymer in the sheet material cools, crystalline domains form and the crystallization is characterized by the clouding of the sheet to a translucent or opaque state. The degree of crystallinity may be varied in the polymers by mixing-in any compatible combination of amorphous polymers and semi-crystalline polymers having varying degrees of crystallinity. The clouding of the sheet provides a convenient non-destructive method of determining that crystallization has occurred to some degree in the polymer. During use when the preferred sealants based on blends of epoxy-containing material and polyester components softens, flows and fills gaps in the surface to be sealed, the epoxy resin and the polyester component form a homogenous system as evidenced by a lack of macroscopic phase separation to the unaided human eye.

The polymers may include nucleating agents to adjust the rate of crystallization at a given temperature, and thus the rate at which green strength builds. Useful nucleating agents include microcrystalline waxes. A suitable wax is, for example, sold by Petrolite Corp. as Unilin™ 700.

Preferred polyesters are hydroxyl-terminated and carboxyl-terminated polyesters that are semi-crystalline at room temperature. Other functional groups that may be present include —NH, —CONH, —NH$_2$, —SH anhydride, urethane, and oxirane groups.

The preferred polyesters are also solid at room temperature. Preferred polyester materials have a number average molecular weight of about 7,500 to 200,000, more preferably from about 10,000 to 50,000, and most preferably, from about 15,000 to 30,000.

Polyester components useful in the invention comprise the reaction product of dicarboxylic acids (or their diester equivalents, including anhydrides) and diols. The diacids (or diester equivalents) can be saturated aliphatic diacids containing from 4 to 12 carbon atoms (including branched, unbranched, or cyclic materials having 5 to 6 carbon atoms in a ring) and/or aromatic acids containing from 8 to 15 carbon atoms. Examples of suitable aliphatic diacids are succinic, glutaric, adipic, pimelic, suberic, azelaic, sebacic, 1,12-dodecanedioic, 1,4-cyclohexanedicarboxylic, 1,3-cyclopentanedicarboxylic, 2-methylsuccinic, 2-methylpentanedioic, 3-methylhexanedioic acids, and the like. Suitable aromatic acids include terephthalic acid, isophthalic acid, phthalic acid, 4,4'-benzophenonedicarboxylic acid, 4,4'-diphenylmethanedicarboxylic acid, 4,4'-diphenylthioetherdicarboxylic acid, and 4,4'-diphenylaminedicarboxylic acid. Preferably the structure between the two carboxyl groups in the diacids contain only carbon and hydrogen, and more preferably, the structure is a phenylene group. Blends of the foregoing diacids may be used.

The diols include branched, unbranched, and cyclic aliphatic diols having from 2 to 12 carbon atoms. Examples of suitable diols include ethylene glycol, 1,3-propylene glycol, 1,2-propylene glycol, 1,4-butanediol, 1,3-butanediol, 1,5-pentanediol, 2-methyl-2,4-pentanediol, 1,6-hexanediol, cyclobutane-1,3-di(2'-ethanol), cyclohexane-1,4-dimethanol, 1,10-decanediol, 1,12-dodecanediol, and neopentyl glycol. Long chain diols including poly(oxyalkylene) glycols in which the alkylene group contains from 2 to 9 carbon atoms, preferably 2 to 4 carbon atoms, may also be used. Blends of the foregoing diols may be used.

Useful commercially available hydroxyl terminated polyester materials include various saturated linear, semi-crystalline copolyesters available from Hüls America, Inc. such as Dynapol™ S330, Dynapol™ S1401, Dynapol™ S1402, Dynapol™ S1358, Dynapol™ S1359, Dynapol™ S1227, and Dynapol™ S1229. Useful saturated, linear amorphous copolyesters available from Hüls America, Inc. include Dynapol™ S1313 and Dynapol™ S1430.

Useful epoxy-containing materials are epoxy resins that have at least one oxirane ring polymerizable by a ring opening reaction. Such materials, broadly called epoxides, include both monomeric and polymeric epoxides and can be aliphatic, cycloaliphatic or aromatic. These materials generally have, on the average, at least two epoxy groups per molecule (preferably more than two epoxy groups per molecule). The "average" number of epoxy groups per molecule is defined as the number of epoxy groups in the epoxy-containing material divided by the total number of epoxy molecules present. The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The molecular weight of the epoxy-containing material may vary from 58 to about 100,000 or more. Mixtures of various epoxy-containing materials can also be used.

Useful epoxy-containing materials include those which contain cyclohexene oxide groups such as the epoxycyclohexanecarboxylates, typified by 3,4-epoxycyclohexylmethyl-3,4-epoxycyclohexanecarboxylate, 3,4-epoxy-2-methylcyclohexylmethyl-3,4-epoxy-2-methylcyclohexanecarboxylate, and bis(3,4-epoxy-6-methylcyclohexylmethyl) adipate. For a more detailed list of useful epoxides of this nature, reference may be made to U.S. Pat. No. 3,117,099.

Further epoxy-containing materials which are particularly useful are glycidyl ether monomers such as glycidyl ethers of polyhydric phenols obtained by reacting a polyhydric phenol with, e.g., an epichlorohydrin (e.g., the diglycidyl ether of 2,2-bis-(2,3-epoxypropoxyphenol)propane). Further examples of epoxides of this type which can be used in the practice of this invention are described in U.S. Pat. No. 3,018,262. Other useful glycidyl ether based epoxy-containing materials are described in U.S. Pat. No. 5,407,978.

There are a number of commercially available epoxy-containing materials which can be used. In particular, epoxides which are readily available include octadecylene oxide, epichlorohydrin, styrene oxide, vinylcyclohexene oxide, glycidol, glycidyl methacrylate, diglycidyl ether of Bisphenol A (e.g., those available under the trade designations EPON SU-8, EPON SU-2.5, EPON 828, EPON 1004F, and EPON 1001F from Shell Chemical Co., and DER-332 and DER-334, from Dow Chemical Co.), diglycidyl ether of Bisphenol F (e.g., ARALDITE GY281 from Ciba-Geigy), vinylcyclohexene dioxide (e.g., ERL 4206 from Union Carbide Corp., Danbury, Conn.), 3,4-epoxycyclohexylmethyl-3,4-epoxycyclohexene carboxylate (e.g., ERL4221 from Union Carbide Corp.), 2-(3,4-epoxycyclohexyl-5,5-spiro-3,4-epoxy)cyclohexane-metadioxane (e.g., ERL-4234 from Union Carbide Corp.), bis(3,4-epoxycyclohexyl) adipate (e.g., ERL-4299 from Union Carbide Corp.), dipentene dioxide (e.g., ERL-4269 from Union Carbide Corp.), epoxidized polybutadiene (e.g., OXIRON 2001 from FMC Corp.), epoxy silanes (e.g., beta-(3,4-epoxycyclohexyl) ethyltrimethoxysilane and gamma-glycidoxypropyltrimethoxysilane, commercially available from Union Carbide), flame retardant epoxy resins (e.g., DER-542, a brominated bisphenol type epoxy resin available from Dow Chemical Co.), 1,4-butanediol diglycidyl ether (e.g., ARALDITE RD-2 from Ciba-Geigy), hydrogenated bisphenol A-epichlorohydrin based epoxy resins (e.g., EPONEX 1510 from Shell Chemical Co.), and polyglycidyl ether of phenolformaldehyde novolak (e.g., DEN-431 and DEN-438 from Dow Chemical Co.).

Useful photo-active curing agents are cationic and include aromatic iodonium complex salts, aromatic sulfonium complex salts, and metallocene salts, and are described in, for example, U.S. Pat. No. 5,089,536 (Palazzotto). Peroxides and oxalate esters can be used with the metallocene salts to increase the cure speed, as described in U.S. Pat. No. 5,252,694 (Willett). Useful commercially available photo-active curing agents include FX-512, an aromatic sulfonium complex salt (3M Company), CD-1010 an aromatic sulfonium complex salt from Sartomer, CD-1012, a diaryliodonium complex salt from Sartomer, an aromatic sulfonium complex salt (Union Carbide Corp.), UVI-6974, an aromatic sulfonium complex salt (Union Carbide Corp.), and IRGACURE 261, a metallocene complex salt (Ciba-Geigy). Photosensitizers may also be included, for example, to enhance the efficiency of the photo-active curing agent and/or to adjust the wavelength of photoactivity. Examples of photosensitizers include pyrene, fluoroanthrene, benzil, chrysene, p-terphenyl, acenaphthene, phenanthrene, biphenyl and camphorquinone.

A variety of thermally activated curing agents may also be incorporated into the compositions. For example, useful thermally activated curing agents include amine-, amide-, Lewis acid complex-, and anhydride-type materials and those which are preferred include dicyandiamide, imidazoles and polyamine salts. These are available from a variety of sources, e.g., Omicure™, available from Omicron Chemical, Ajicure™, available from Ajinomoto Chemical, and Curezol™, available from Air Products.

In certain cases, it may be advantageous to add an accelerator to the composition, so that it will fully cure at a lower temperature, or will fully cure when exposed to heat for shorter periods. Imidazoles are useful, suitable examples of which include 2,4-diamino-6-(2'-methylimidazoyl)-ethyl-s-triazine isocyanurate; 2-phenyl-4-benzyl-5-hydroxymethylimidazole; and Ni-imidazole-phthalate.

Other useful blends for sealant layer 14 include epoxy-acrylate blends, such as those described, e.g., in Kitano et al., U.S. Pat. No. 5,086,088. These blends are preferably the photopolymerized reaction product of a composition featuring (i) a prepolymeric (i.e., partially polymerized to a viscous syrup typically between about 100 and 10,000 centipoise) or monomeric syrup of an acrylic or methacrylic acid ester; (ii) optionally, a reinforcing comonomer; (ii) an epoxy resin; (iv) a photoinitiator; and (v) a thermally activated curing agent for the epoxy. Also useful is the thernally polymerized reaction product of a composition featuring (i) a prepolymeric (i.e., partially polymerized to a viscous syrup typically between about 100 and 10,000 centipoise) or monomeric syrup of an acrylic or methacrylic acid ester; (ii) optionally, a reinforcing comonomer; (iii) an epoxy resin; (iv) a thermal initiator; and (v) a photo-active curing agent for the epoxy. Suitable epoxy resins, and thermally activated curing agents include those described above. Examples of useful photoinitiators include quinones, benzophenones, triacylimidazoles, acylphosphine oxides, bisimidazoles, chloroalkyltriazines, benzoin ethers, benzil ketals, thioxanthones, and acetophenone derivatives, and mixtures thereof Examples of useful thermal initiators include organic peroxides and azo compounds. During use when the preferred sealants based on blends of epoxy-containing material and polyacrylate components softens, flows and fills gaps in the surface to be sealed, the epoxy resin and the polyacrylate component form a homogenous, single phase system, as evidenced by a lack of macroscopic phase separation to the unaided human eye.

The relative amounts of the different ingredients are selected to balance ultimate tensile strength and heat resistance, on the one hand, with flexibility and green strength build-up on the other hand. For example, increasing the amount of epoxy resin increases ultimate tensile strength and heat resistance, while decreasing flexibility and rate of green strength build-up. Conversely, increasing the amount of polyester or polyacrylate increases flexibility and rate of green strength build-up, while decreasing ultimate tensile strength and heat resistance.

In the case of epoxy-polyacrylate and epoxy-polyester blends, the compositions typically include from 0.01 to 95 parts per 100 parts total of the epoxy-containing material and, correspondingly, from 99.99 to 5 parts of the polyester or polyacrylate component. More preferably, the compositions include from 0.1 to 80 parts of the epoxy-containing material and, correspondingly, from 99.9 to 20 parts of the polyester or polyacrylate component. Most preferably, the compositions include from 0.5 to 60 parts of the epoxy-containing material, and, correspondingly, from 99.5 to 40 parts of the polyester or polyacrylate component.

Other melt-flowable thermosettable compositions useful for sealant layer 12 include urethane-based materials such as moisture-curable urethanes that may also be hot-melt compositions. Such compositions often comprise one or more polyisocyanates (e.g., diisocyanates such as 4,4'-diphenylmethylene diisocyanate, toluene diisocyanate, isophorone diisocyanate, or hexamethylene diisocyanate, including isocyanate derivatives of these materials), one or more polyhydroxy-functional materials (e.g, polyester or polyether polyols including polycaprolactones), optionally a catalyst for the moisture curing reaction (e.g, dibutyltin dilaurate), and optionally a variety of additives or adjuvants (e.g., fillers, colorants, beads, bubbles, fibers, plasticizers, tackifiers, flow control agents, thixotropes, adhesion promoters, etc.) that do not materially interfere with the moisture curing reaction.

Sealant layer 12 may also be formed from a thermoplastic composition. Examples of suitable thermoplastic compositions include polyesters, thermoplastic elastomer block copolymers (e.g., styrene-butadiene- or styrene-isoprene-based block copolymers), phenoxy resins, polyurethanes, silicones, and polyamides. Polyesters, block copolymers and polyurethanes are particularly preferred thermoplastics. Preferably, thermoplastic compositions used in the sealant layer are provided as homogenous, single phase materials that do not include a dispersed phase such as cross-linked particles. Thermoplastic compositions selected for sealant layer 12 preferably display a softening temperature (as measured by a ring and ball softening test) that is greater than the service temperature for the ultimate construction into which the sealant-bearing article will be incorporated. The service temperature for the ultimate construction refers to the maximum temperature that the ultimate construction is expected to be exposed to under ordinary use conditions.

Preferred compositions for sealant layer 12 are sealant compositions that resist flow, and thus substantially retain their shape, when heated to a temperature above the softening temperature of the sealant, and for thermosetting sealant compositions, a temperature that is less than (a) in the case of thermally activated curing agents, the thermal activation temperature of the curing agent or (b) in the case of photo-active curing agents, the thermal decomposition temperature of the curing agent, until subjected to pressure on the order of the pressure applied during installation as the tape-bearing substrate is pressed into contact with the other substrate. Under the influence of heat and applied pressure, these compositions undergo controlled flow to conform and functionally seal against uneven surfaces.

The softening temperature represents the minimum temperature at which the composition is sufficiently malleable such that it can be mounted to and held in place on a substrate. The softening temperature is a function of the particular sealant composition. In the case of crystalline or semi-crystalline component-containing sealing compositions, this generally corresponds to the melting temperature of this component. Typically, the upper temperature limit is on the order of about 200° C.

To determine whether any particular sealant composition meets these performance criteria, the composition is subjected to the test procedure described in further detail in the "Examples" section below. Briefly, this test involves placing a sample of the composition on a plate maintained at an angle in an oven, heating the sample to the desired temperature, and observing the extent to which the sample loses its initial shape and flows down the surface of the plate within a set period of time.

Examples of compositions meeting these requirements include both thermoplastic and thermosettable materials. In the case of the latter, the compositions may incorporate one or more photo-active curing agents, thermally activated curing agents, or combinations thereof, with the use of photo-active curing agents being preferred.

Particular compositions meeting these requirements include the epoxy/polyester and epoxy/polyacrylate compositions described above, but particularly designed or formulated such that melt-flow does not occur under the influence of heat and gravity alone, but instead requires applied pressure as well. One useful formulation involves including one or more thixotropic agents into the composition in an effective amount; i.e., an amount necessary to achieve the desired Theological properties. In general, the total amount of thixotropic agents is no greater than about 20% by weight, based upon the total weight of the uncured sealant composition, preferably no greater than about 10% by weight, more preferably no greater than about 5% by weight, and most preferably in the range of about 3–5% by weight.

Suitable thixotropic agents do not materially interfere with cure, in the case of thermosetting compositions, or otherwise cause degradation of the composition. Representative examples of thixotropic agents include particulate fillers, beads (which may be of the glass, ceramic or polymeric type), bubbles (which may be of the glass, ceramic or polymeric type), and chopped fibers, as well as combinations thereof Suitable particulate fillers include, e.g., hydrophobic and hydrophilic silica, calcium carbonate, titania, bentonite, clays and combinations thereof Suitable fibers include polymeric fibers (e.g., aromatic polyamide, polyethylene, polyester and polyimide fibers), glass fibers, graphite fibers, and ceramic fibers (e.g., boron fibers).

Other materials that can be incorporated into sealant layer 12 include, for example, stabilizers, antioxidants, plasticizers, tackifiers, flow control agents, adhesion promoters (e.g., silanes and titanates), colorants, and other fillers.

Bonding layer 16 is preferably in the form of a continuous layer. The width of bonding layer 16 is application-dependent. In general, however, the width of bonding layer 16 is preferably no greater than the width of core layer 14. In addition, both single and multi-layer bonding compositions are envisioned.

In use, bonding layer 16 is disposed between core layer 14 and the surface of the substrate to which tape 10 is affixed. The purpose of bonding layer 16 is to enhance adhesion between the substrate and core layer 14. It may be integral with tape 10, as shown in FIG. 1, or may be provided separately on the face of the substrate prior to affixing tape 10 to the substrate. It is particularly useful when the substrate is glass.

The thickness of bonding layer 16 is selected based upon the particular application for which the tape is to be used. In general, however, the thickness of bonding layer 16 is no greater than about 500 microns, preferably no greater than about 250 microns, and more preferably no greater than about 125 microns.

Suitable materials for bonding layer 16 are tacky at the installation temperature. Both thermoplastic and thermosetting materials may be used. The bonding layer is ordinarily selected so as to have, as compared to the sealant layer, a different composition, thickness or both. The choice of a particular material for bonding layer 16 depends on the substrate to which tape 10 is affixed. For example, in the case of glass substrates, thermosetting materials are preferred, whereas in the case of encapsulated glass substrates, in which a polymer encapsulates the peripheral edge of the glass, it is preferred to use thermoplastic bonding materials.

The bonding layer is designed to have a relatively high ultimate tensile strength following cure (in the case of thermosettable materials) or upon cooling (in the case of thermoplastic materials), without being brittle, to promote localized failure in the core layer. The particular minimum tensile strength value is application-dependent. In general, however, tensile strengths are on the order of at least about 3.5 MPa, preferably at least about 5.2 MPa, and more preferably at least about 6.9 Mpa when measured according to the test procedure described in the "Examples" section below. For example, in the case of windshields installed in motor vehicles, the ultimate tensile strength of the bonding layer preferably is greater than about 3.5 MPa.

Thermosetting materials may incorporate a photo-active curing agent (i.e., photo-curable materials) or a thermally activated curing agent (i.e., thermally curable materials). Preferably, bonding layer 16 cures under conditions different from the conditions under which sealant layer 12 cures. For example, if both sealant layer 12 and bonding layer 16 are photo-curable materials, the wavelength of radiation needed to initiate cure of layer 12 differs from that needed to initiate cure of layer 16. Similarly, if both sealant layer 12 and bonding layer 16 are thermally curable materials, they cure at different temperatures. Bonding layer 16, for example, is typically formulated such that it cures within the range 90–200° C., preferably within the range 120–170° C., and more preferably within the range 140–160° C. It is also possible to use a photo-curable material for layer 12 and a thermally curable material for layer 16, and vice versa.

Examples of suitable materials for bonding layer 16 include epoxy/polyacrylate blends as described, e.g., in Kitano et al., U.S. Pat. No. 5,086,088; epoxy/amorphous polyester blends; polyolefin adhesives (e.g., polyethylene, polypropylene, polyhexene, polyoctene, and blends and copolymers thereof); ethylene-vinyl monomer (e.g., ethylene-vinyl acetate) copolymer adhesives; epoxy adhesives; silicone adhesives; silicone-acrylate adhesives; acrylic adhesives; rubber adhesives (e.g., butyl rubber); and adhesives based upon thermoplastic elastomer block copolymers (e.g., styrene-butadiene-styrene, styrene-isoprene-styrene, or styrene-ethylene-propylene-styrene block copolymers). These materials may be provided in film or bulk form, and may be supplied as hot melt materials. Depending upon the substrate to which the bonding layer will be adhered, the use of a primer may be advantageous in promoting adhesion. An example of a suitable commercially available material is 3M Company's Structural Bonding Tape No. 9214.

Other materials that can be incorporated into bonding layer 16 include, for example, stabilizers, antioxidants, plasticizers, tackifiers, flow control agents, adhesion promoters (e.g., silanes and titanates), colorants, thixotropes, and other fillers.

Optional, temporary, protective liner 18, if included, protects bonding layer 16 (if present) or core layer 14 from damage, actinic radiation exposure, and dirt or other contaminants until article 10 is intended for use and is typically removed shortly before attaching article 10 to a substrate. Liner 18 may comprise a variety constructions, including those conventionally used to protect adhesive surfaces. For example, the liner may be in the form of a paper or polymeric web having a release material such as a polyolefin (e.g., polyethylene, polypropylene, etc.), silicone or fluorosilicone on a surface thereof that bears against the bonding layer or the core layer. Liners that are slightly tacky can be used to protect non-tacky surfaces.

Manufacture

Multi-layer articles according to the invention may be readily prepared in many ways. For example, the ingredients for the sealant composition may be melted and stirred in a suitable mixing vessel (e.g., a batch mixer, an extruder, etc.) at an elevated temperature low enough to avoid activating any thermally activated curing agent or decomposing any photo-active curing agent present in the sealant composition. After mixing, the sealant composition may be formed into its final shape by a variety of different methods. For example, the sealant composition can be coated onto a release liner using a heated knife coater. Alternatively, the sealant composition ingredients may be compounded in an extruder and then extruded through a die having a desired profile to produce a shaped strip of sealant; i.e., a strip having the desired cross-sectional shape. In another approach, the composition can be extruded as a mass and delivered between a pair of motor-driven chilled rolls spaced apart a predetermined distance to form a flat sheet of the sealant composition that may be subsequently calendared to the desired thickness. In another approach, a flat die may be coupled to the extruder to extrude the sealant composition into a flat sheet, either onto a release liner or directly onto a separately provided core layer. A structure can be imparted to a major surface of the sealant layer by extruding the sealant sheet between a pair of nip rolls, at least one of which is embossed with the desired pattern. A sheet of the sealant composition can also be embossed at any subsequent time by heating the sheet (if necessary) and pressing the sheet with an embossing roll (which may be heated or unheated) carrying the desired pattern.

In one preferred method of manufacture, where the sealant composition comprises an epoxy-containing material and a polyester component, these ingredients are compounded using a twin screw extruder adjusted to provide an appropriate barrel temperature profile. Typically, the feed end of the extruder is set at a relatively low temperature, e.g., about 60 to 70° C., and the temperature is increased along the length of the barrel such that the temperature is high enough to mix the sealant composition ingredients into a uniform blend, but low enough to avoid activating any curatives at the die end of the extruder, e.g., about 60 to 110° C. Residence time within the extruder should also be balanced with the extruder temperature profile so as to avoid activating any curatives. Preferably the extruder has one or more vent ports along the barrel toward the die end so that a vacuum can be applied to remove entrapped air and moisture. The composition is extruded into a calendar nip or through an appropriately shaped die, which results in a sheet of the sealant composition having the desired thickness and width.

Batch mixing techniques may also be employed in preparing the sealant compositions used in the invention and for certain sealants (e.g., those that are moisture-curable) such approaches may be preferred.

The core layer can also be prepared in many ways, depending on its composition.

For example, in a thermosettable acrylic core layer, appropriate acrylate and/or methacrylate monomers are mixed together and then combined with a suitable photo- or thermally-activated polymerization initiator. The monomer composition is then preferably sparged with an inert gas such as nitrogen to eliminate most of the oxygen from the composition, and then either exposed to an ultraviolet light source or heated to initiate polymerization of the monomer mixture. Once the desired viscosity has been reached, the reaction is quenched by either removing the light source, cooling the composition, sparging with oxygen, or a combination thereof, resulting in a viscous polymer/monomer mixture having a syrup-like consistency.

The polymer/monomer mixture may be blended with various ingredients such as additional initiator, particulate additives such as fumed silica (of the hydrophilic and/or hydrophobic type), fillers such as glass, ceramic or polymeric bubbles, or glass, ceramic or polymeric beads, thixotropes, colorants, stabilizers, antioxidants, plasticizers, tackifiers, surfactants and other flow control agents, adhesion promoters (e.g., silanes and titanates), and crosslinking agents. This composition is then degassed and/or sparged with an inert gas such as nitrogen, and then coated between a pair of release liners (e.g., silicone-coated, biaxially-oriented polyethylene terephthalate films). For compositions that are to be further polymerized by exposure to ultraviolet radiation, the release liners are preferably transparent to ultraviolet radiation.

Alternatively, the composition may be pumped to a frother where an inert gas such as nitrogen is introduced into the composition creating a cellular foam mixture that is subsequently coated between a pair of release liners, such as those just described. The uniformity, density, cell size, tensile strength and elongation of the final foam product are controlled by the selection and amount of surfactant, the nitrogen flow rate, and the pressure in the frother, as described in the technical literature.

If the composition is to be polymerized with actinic radiation, the composite construction comprising the polymer/monomer syrup between the pair of release liners is, for example, irradiated by an ultraviolet light source, preferably of low intensity (e.g., below about 20 milliWatts/square centimeter as measured with NIST units, more preferably below about 10 milliWatts/square centimeter). The amount of radiation energy required to polymerize the composition varies depending upon the thickness and its chemical make-up, but typically ranges from about 200 to 2,000 millijoules. Preferably, sufficient radiation is used to reduce the volatile monomer content to less than $_5$b/o, and more preferably to less than 2% by weight of the entire composition. Alternatively, the composition can be polymerized with heat.

If the polymerization reaction is exothermic, temperature control of the composite construction (preferably to less than 85° C.) is desired. This can be accomplished in a number of ways including blowing cool air against the faces of the composite construction, immersing the composite construction in a water bath, running the composite construction over cooling platens, and the like.

In the case of a urethane-based core layer, the core layer components (whether from a one- or a two-part system) are mixed just prior to coating the resulting composition between two release liners, such as those described previously. A small amount of heat may be used to accelerate the curing reaction, although many urethanes will cure at room temperature. Alternatively, urethane compositions, after mixing, can be coated between a release liner and a sealant layer, between a sealant layer and a bonding layer, or between a release liner and a bonding layer. When the urethane composition is applied directly to a sealant layer and/or a bonding layer, additional layers, e.g., tie layers advantageously may not be needed.

Polyethylene and ethylene vinyl acetate-based foams may also be used and are typically produced by extruding a resin composition from an extruder and foaming the material before or after crosslinking.

The bonding layer may also be prepared in many ways. Pressure-sensitive adhesive bonding layers are formed from compositions that can be prepared by solvent, emulsion or solventless processes. For solvent- and emulsion-based systems, the compositions are coated onto a release liner (such as those described above) and heated in an oven to evaporate the solvent or the water and form an adhesive film. Such adhesives are well-known and described in, for example, U.S. Pat. No. Re. 24,906 (Ulrich). For solventless compositions, a pre-polymeric composition is coated onto a release liner and exposed to an energy source to form an adhesive film. These types of processes are described in, for example, U.S. Pat. No. 4,181,752 (Martens et al.), and U.S. Pat. No. 5,086,088 (Kitano et al.).

In a preferred embodiment, a bonding layer composition is prepared by mixing acrylic monomers such as n-butyl acrylate and N-vinylcaprolactam, an epoxy resin such as diglycidylether of Bisphenol A, a photoinitiator, a thermal curative, and fumed silica in a high speed Cowles mixer. The composition is then coated between polyethylene terephthalate release liners and exposed to an ultraviolet radiation source, similar to that described above for the manufacture of acrylic foam core layers, to produce a latently reactive, curable pressure sensitive adhesive.

One approach is particularly useful when an acrylic foam core layer is to be combined with a solventless pressure sensitive acrylic adhesive bonding layer of the type described above. The composition for the acrylic foam core layer may be coated onto an ultraviolet radiation-transparent release liner as described above, and then the composition for the pressure-sensitive acrylic adhesive bonding layer is coated onto the core layer composition. A second ultraviolet radiation-transparent release liner is then placed over the bonding layer composition and the entire construction is exposed to ultraviolet light to concurrently cure both the acrylic foam core layer and the pressure-sensitive acrylic adhesive bonding layer thereby yielding a finished composite. It is also contemplated that the bonding layer and the core layer, the core layer and the sealant layer, or the core layer, the bonding layer, and the sealant layer can be made simultaneously using, for example, the techniques described in conjunction with the manufacture of urethane-based core layers.

The multi-layer articles of the invention may also be produced by laminating a previously prepared sealant layer, core layer and bonding layer (if provided). For example, the bonding layer and/or the sealant layer can be readily laminated to the core layer under the influence of pressure to produce a finished tape. When the core layer, sealant layer, and bonding layer are each made separately, adhesion between these layers may be enhanced through the use of primers or tie layers. The primer or tie layer can be applied by extrusion coating a compatible material onto either the sealant layer or the core layer, coating a primer onto either layer, optionally drying the primer or tie layer, and then pressing the layers together to form a multi-layer article according to the invention.

In another embodiment, a sealant layer can be extruded or coated directly onto a core layer.

Once the tape has been fabricated a release liner may optionally be laminated to protect the exposed surfaces of the sealant layer and/or the core layer or the bonding layer (if provided). The tape may be converted into the desired final form by, for example, slitting it to the desired width and winding it up into roll form and around a suitable plastic or paper core if needed. Alternatively, the tape can be slit or otherwise cut into discrete lengths or die cut into desired shapes.

Use

The above-described tapes can be used to establish a seal between a variety of substrates. For the sake of simplicity, however, the sealing process will be described in the context of installing a glass windshield in a motor vehicle.

Figure 2:
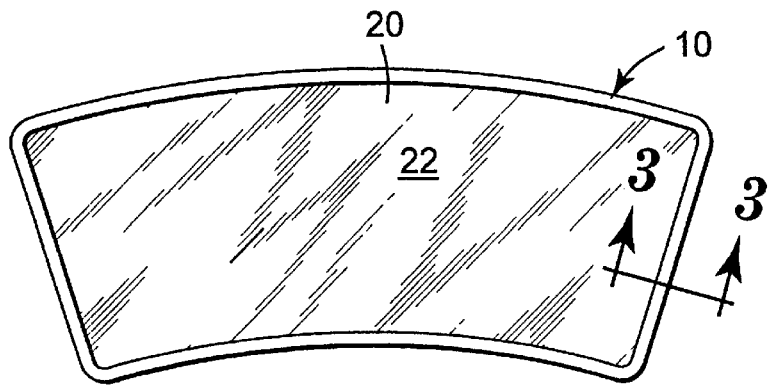
FIG. 2 is a plan view of a motor vehicle windshield having a multi-layer tape secured to one major face thereof according to the invention.
Figure 3:
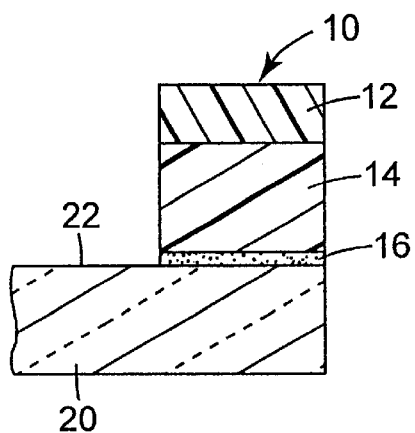
FIG. 3 is an enlarged cross-sectional view taken along lines 3—3 in FIG. 2.

Referring to FIGS. 2 and 3, tape 10 is initially affixed to one face 22 of glass windshield 20 through bonding layer 16 such that the tape substantially surrounds the perimeter of face 22 and smoothly adheres to the glass without wrinkling, puckering or gapping as the tape traverses the approximately ninety degree bends at the corners of the windshield. This arrangement avoids forming stress concentration points previously associated with the use of discontinuous spacers. If the bonding layer is not tacky at room temperature, it is then activated to bond tape 10 permanently to the glass, preferably without activating sealant layer 12. The particular activation method used depends on the composition of the sealant and bonding layers. Examples of suitable activation methods include thermal and actinic radiation (e.g., ultraviolet or visible radiation). In the case of thermal radiation, either the tape, the glass, or both, may be heated. Because the sealant layer is not activated, the resulting tape-bearing windshield can be packed or racked in close proximity with other tape-bearing windshields without transferring sealant to a neighboring windshield. The tape also prevents the windshields from bumping into each other which eliminates costly packaging materials that space adjacent racked or packed windshields from each other (e.g., polymeric foam or cellulosic spacers) and which may require separate disposal or recycling.

Figure 4:
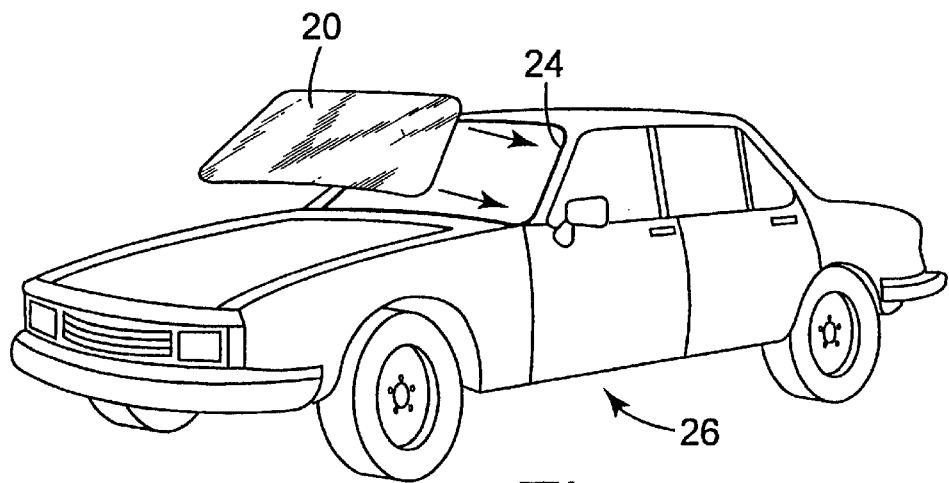
FIG. 4 is an exploded perspective view illustrating the installation of a windshield into a motor vehicle according to the invention.
Figure 5:
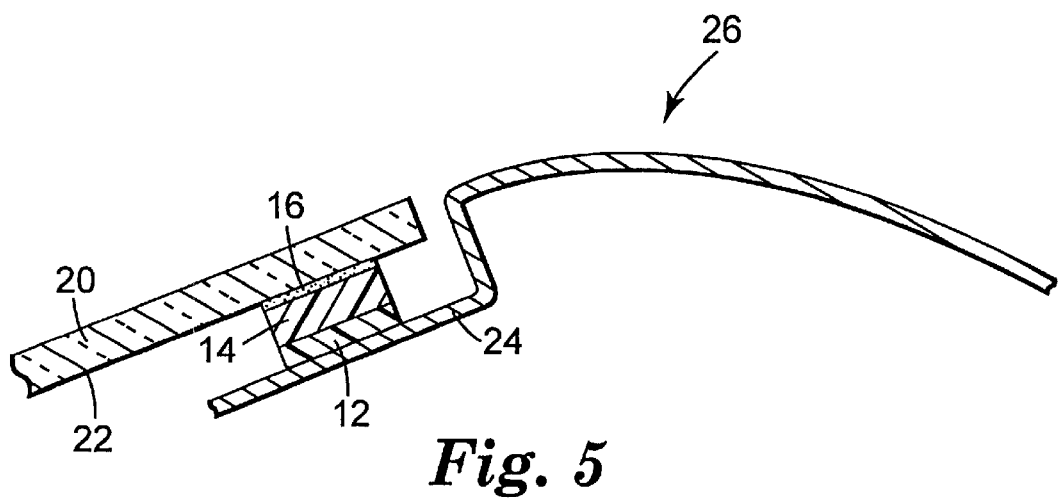
FIG. 5 is a schematic cross-sectional drawing showing, according to the invention, the use of a multi-layer tape to secure a windshield to a frame in a motor vehicle.

The next step is to heat the sealant, e.g., by exposing it to a bank of heat lamps, to the point where the sealant softens but does not flow. As represented by FIGS. 4 and 5, the windshield containing the heated, softened sealant is then installed in the frame 24 of a motor vehicle 26. It is also possible to heat the sealant after installing it in the motor vehicle frame to soften the sealant. During installation, pressure is applied that causes the softened sealant to flow and "self level" with the core layer 12 relative to the uneven surface of the vehicle. The sealant flows away from high spots and fills in recessed areas such as spot welds and cavities, creating an effective seal. In severely distorted metal areas, the core layer 12 compresses upon itself and may be permanently deformed in the process of creating a seal with the uneven surface.

Following intimate contact between the sealant layer and the vehicle frame, the heat sink of the large metal vehicle mass effectively quenches the sealant layer, allowing it to solidify rapidly, recrystallize (in the case of crystalline or semi-crystalline component-containing sealant compositions), and form a durable, permanent bond.

A variation of this process involves the use of photocurable sealant layers (i.e., sealant layers that incorporate a photo-active curing agent). Using a photocurable sealant composition is advantageous because the tape can be affixed to the windshield and run through a glass manufacturing autoclave cycle to activate the bonding layer, while at the same time softening the sealant composition without causing it to flow. After leaving the autoclave, the construction is cooled, causing the softened sealant layer to re-solidify. Next, the sealant composition is activated, e.g., by exposure to heat followed by actinic radiation, after which the tape-bearing windshield is placed in the vehicle frame. The radiation simultaneously softens and initiates cure of the sealant composition. Once installed, the heat sink created by the vehicle body effectively quenches the sealant layer, causing it to re-solidify and, in the case of crystalline or semi-crystalline component-containing compositions, to re-crystallize. At this point, the green strength of the sealant layer is sufficiently high that a person can drive away in the vehicle even though the sealant continues to cure.

In the case of photocurable sealant compositions, it is also necessary to protect the composition from premature activation, e.g., during storage and shipping. This may be accomplished, for example, by covering the sealant composition with a radiation-blocking release liner. Alternatively, the entire tape-bearing construction can be stored in a radiation-blocking container.

Although it is preferable to include the sealant layer, core layer, and bonding layer in the form of a single integral tape, it is also possible to apply these materials separately, or in various combinations with each other, to the glass surface. For example, it is possible to apply a tape featuring the core layer and the bonding layer to the glass surface, followed by application of a separate sealant layer. Alternatively, the bonding layer may be provided in the form of a primer applied to the glass surface, after which a two-layer tape (containing the sealant layer and the core layer) is affixed to the primed surface.

Figure 6:
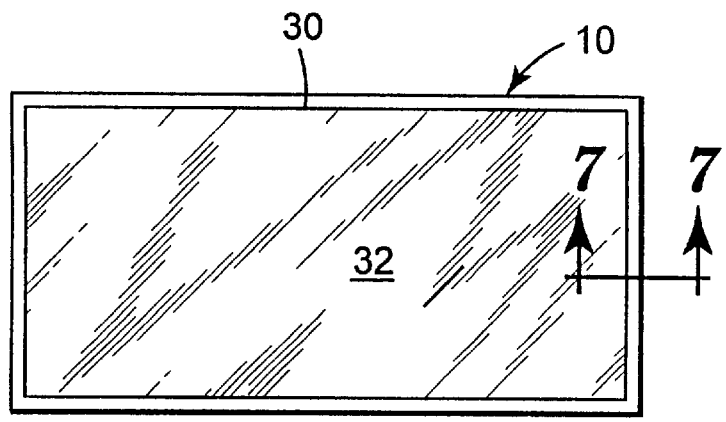
FIG. 6 is a plan view of a substrate having a multi-layer tape secured to an edge surface thereof according to the invention.
Figure 7:
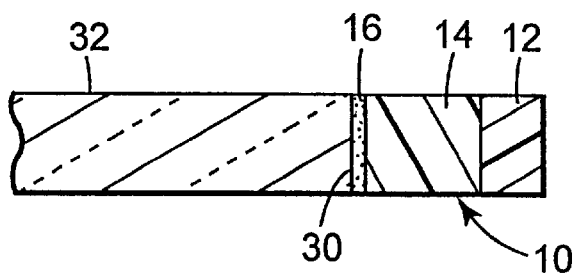
FIG. 7 is an enlarged cross-sectional view taken along lines 7—7 in FIG. 6.

Although in the case of substrates such as windshields it is preferable to apply the tape to a face of the substrate, it is also possible to apply the tape around the edge 30 of a substrate 32, as shown in FIGS. 6 and 7, such that the tape 10 substantially encircles the substrate. Such constructions are useful, e.g., in architectural applications for bonding the substrate within a groove such as a window frame.

Figure 8:
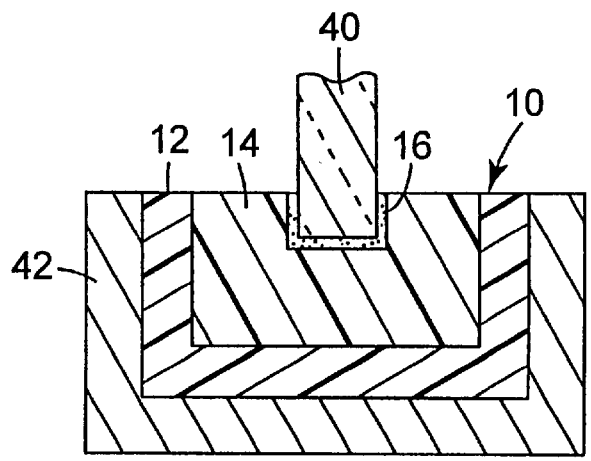
FIG. 8 is a sectional view illustrating a substrate sealed into a bracket using a multi-layer tape according to the invention.

In addition to windshields, in which a seal is established between a face of the windshield and the frame of a motor vehicle, it is also possible to seal a substrate 40 bearing a tape 10 according to the invention within a U-shaped bracket 42, as shown in FIG. 8.

The invention will now be described further by way of the following non-limiting examples.

EXAMPLES

Unless otherwise specified the materials used in these examples may be obtained from standard commercial sources such as Aldrich Chemical Co. of Milwaukee, Wis. All amounts used in the examples are in parts by weight unless otherwise specified. Sealant Layers were prepared by calendering the corresponding Sealant Composition to a desired thickness. Thus Sealant Layer A is composed of Sealant Composition A, Sealant Layer B is composed of Sealant Composition B, and so on. All Sealant Layers, Core Layers and Bonding Layers were nominally 1.0 mm thick unless otherwise specified. The following list contains commercial sources for materials employed in the examples that follow. The Fusion Systems Processor (lamp housing and conveyor apparatus) was fitted with a V bulb unless otherwise specified.

Epoxy Resin A is a Bisphenol A endcapped aliphatic epoxy resin, as described in Example 1 of U.S. Pat. No. 5,407,978 (Bymark et. al.).

Primer Composition A is: 2.45 parts Nipol™ 1002, 1.23 parts Epon™ 828, 2.05 parts Versamid™ 115, 42.20 parts methyl ethyl ketone, 50.84 parts toluene, 1.23 parts 1-butanol.

Metallocene Catalyst A is $Cp(Xylenes)Fe^+SbF_6^-$, also described as: ($eta^6$-xylenes) ($eta^5$-cyclopentadienyl) iron (1+) hexafluoroantimonate as disclosed in U.S. Pat. No. 5,089,536 (Palazzotto). (Cp=cyclopentadiene.)

Scotchkote™ 215, FX-512, K15 glass bubbles (250 mesh), and Auto Glass Urethane Windshield Adhesive No. 08693 urethane paste sealant were obtained from 3M Company of St. Paul, Minn.

E-coated steel panels (ED 5100), and painted stell panels clear coated with DCT 5000, DCT 5002 and Stainguard™ IV were obtained from Advanced Coating Technologies, Inc. of Hillsdale, Mich.

Dicyandiamide (CG-1200) and Curezol™ 2MZ-Azine were obtained from Air Products and Chemicals, Inc. of Allentown, Pa.

n-Butyl acrylate, N-vinylcaprolactam were obtained from BASF Corp. of Mount Olive, N.J.

Vitel™ 5833B was obtained from Bostik of Middleton, Mass.

Cab-O-Sil™ M5 was obtained from Cabot Corp. of Boston, Mass.

Irganox™ 1010 was obtained from Ciba Specialty Chemicals of Ardsley, N.Y.

Aerosil™ R972 was obtained from DeGussa Corp. of Ridgefield Park, N.J.

Voranol™ 230–238 was obtained from Dow Chemical Co. of Midland, Mich.

Isocryl™ EP550, Octaflow™ ST 70 and Oxymelt™ A-1 were obtained from Estron Chemical, Inc. of Calvert City, Ky.

Melinex™ 054 is a treated biaxially oriented polyester film available from ICI Americas of Wilmington, Del.

Fusion Systems Processor and accessories were obtained from Fusion Systems Corp. of Rockville, Md.

Versamid™ 115 was obtained from Henkel Corp. of Ambler, Pa.

Dynapol™ S1402, Dynapol™ S1313, Dynapol™ S1359, Dynacoll™ 7130, Synthetic Resin SK, Hydrosil™ 2627, Synthetic Resin AP, Synthetic Resin CA, Synthetic Resin LTH, Polyester A (a hydroxyl functional, semi-crystalline copolymer of 50 wt. % butanediol, 23 wt. % terephthalic acid, and 27 wt. % sebacic acid, with a melting point of 116° C., a glass transition temperature of –40° C., and a melt flow rate at 160° C. of 250 g/1 0 minutes), were obtained from Htils America Inc. of Somerset, N.J.

Santicizer™ 278 was obtained from Monsanto Co. of St. Louis, Mo.

Penn Color 9B1 17 pigment was obtained from Penn Color of Doylestown, Pa.

Unilin™ 700 wax was obtained from Petrolite Corp. of St. Louis, Mo.

5 Meyer rods (wire wound rods) were obtained from R & D Specialties of Webster, N.Y.

KB-1 and SarCat™ CD 1012 were obtained from Sartomer Co. of Exton, Pa.

Epon™ 1001, Epon™ SU-8 and Epon™ 828 were obtained from Shell Chemical Co. of Houston, Tex.

Benzoflex™ S-404 was obtained from Velsicol Chemical Corp. of Rosemont, Ill.

Nipol™ 1002 was obtained from Zeon Chemicals, Inc. of Louisville, Ky.

Anodized aluminum panels were obtained from Hiawatha Panel & Name Plate Co., Inc., Minneapolis, Minn.

Test Methods

45° Flow Test

An E-coated panel was cleaned by spraying with 50% aqueous isopropanol and wiping dry, allowing sufficient time to ensure complete drying. The sample to be measured (typically 14.5 mm by 25.4 mm) was lightly adhered to an E-coated panel so that the narrow edge of the sample was pointing down the panel. The panel was then placed in an oven at a 45° incline for 12 minutes at 177° C. unless otherwise specified. The sample was then removed from the oven and allowed to cool to room temperature. Flow was measured as the distance (in mm) the sample had flowed relative to its initial position.

Tensile and Elongation Test

Tensile measurements were made in the usual fashion with attention to the following parameters. Samples were cut to size using ASTM method D-412, Die C. The samples were then conditioned under constant temperature (23±2° C.) and humidity (50±10% relative humidity) for at least 24 hours after preparation and before testing. Tensile strength and elongation were measured using an Instron tensile tester using a jaw gap of 50.8 mm and a crosshead speed of 508 mm/minute. Peak tensile strength (in MPa) and optionally % elongation at peak were recorded.

Overlap Shear Test

A sealant composition was laminated between anodized aluminum and E-coated aluminum coupons both 25.4 mm by 76.2 mm that had been cleaned with 50% aqueous isopropanol as follows: a 12.7 mm by 25.4 mm sample of sealant was attached flush to the narrow edge of both coupons so that the overall construction was about 63.5 mm in length. The laminate was heated in an oven at 140° C. for 25 minutes while under approx. 2.3 kg compressive force, unless otherwise specified. Samples were then conditioned under constant temperature and humidity (23±2° C. and 50±10% relative humidity) for at least 24 hours after preparation and before testing.

Overlap shear was measured using an Instron tensile testing apparatus using a crosshead speed of 50.8 mm/minute, and a jaw gap of 50.8 mm. The maximum force before breakage of the sample and the failure mode (e.g., cohesive, adhesive, mixed) were noted.

Example 1

This example describes the preparation of Bonding Layer A. A solution was prepared by mixing of 29 g n-butyl acrylate (BA) and 29 g N-vinylcaprolactam (NVC) and heating at about 49° C. To this solution, an additional 42 g of BA and 0.05 g of hexanediol diacrylate were added. This acrylate monomer solution, 45 g of diglycidyl ether of bisphenol A (Epon™ 828), and 25 grams of diglycidyl ether oligomer of bisphenol A (Epon™ 1001) were placed in a glass jar. The jar was sealed and placed on rollers at ambient temperature (about 21° C.) until a uniform adhesive solution resulted. To this epoxy/acrylate solution (170.05 parts), 7 g CG-1200, and 2.7 g of an accelerator (Curezol™ 2MZ-Azine) were added and mixed with at Cowles blade mixer at high speed, while keeping the temperature below about 37° C., for 15 minutes. In the final step, 0.24 g of benzil dimethyl ketal photoinitiator (KB-1), 0.1 g of Irganox™ 1010 antioxidant, 0.38 g of Penn Color 9B117 pigment, and 8 g of Cab-O-Sil™ M5 silica were added and mixed to form a uniform mixture. The adhesive mixture was degassed, and then coated to a thickness of 0.508 mm between two silicone release material treated polyester films. The sandwiched coating of adhesive was exposed to ultraviolet light having a majority of its emissions between 300 and 400 nm with a peak emission at 351 nm to form a pressure sensitive adhesive tape. The adhesive was exposed to 350 mJ/cm$^2$ (NIST units) on the top and bottom, with a total energy of approx. 700 mJ/cm$^2$. The intensities were 4.06 mW/cm$^2$ on the top and 4.03 mW/cm$^2$ on the bottom of the adhesive.

Examples 2–7 describe the preparation of various Core Layers

Example 2

A composition was prepared by mixing 87.5 parts isooctyl acrylate, 12.5 parts acrylic acid, and 0.04 parts of a photo-initiator (benzil dimethyl ketal available as Irgacure™ 651 from Ciba Geigy). The mixture was exposed to low intensity ultraviolet radiation (described below) to a viscosity of about 2200 centipoise. Then an additional 0.19 part of benzil dimethyl ketal was added as well as 0.55 part 1,6-hexanedioldiacrylate, 8 parts K15 glass bubbles, and 2 parts of hydrophobic silica (Aerosil™ R972). The composition was mixed until it was uniform throughout, degassed, and then pumped into a 90 mm frother (available from E.T. Oakes, Hauppage, N.Y.) operating at about 300 to 350 rpm. Concurrently, and continuously, nitrogen, black pigment (PennColor 9B1117), and approximately 1.5 parts of a 60/40 mixture of surfactant A/surfactant B were fed into the frother per 100 parts of the total composition. The nitrogen was controlled to provide the desired foam density. Surfactant A was $C_8F_{17}SO_2N(C_2H_5)(C_2H_4O)_7CH_3$ and surfactant B was a 50% solids solution in ethyl acetate of the fluoroaliphatic oligomer of Example 2 of U.S. Pat. No. 3,787,351. The black pigment was added in an amount to provide a finished product L value of about 32 as measured with a HunterLab colorimeter (Color 'L' colorimeter and a D25 Optical Sensor, both available from HunterLab Associates, Reston Va.).

The frothed mixture was delivered under a pressure of 205 kiloPascals to the nip of a roll coater to a thickness of about 1 mm between a pair of sheets of transparent, biaxially-oriented polyethylene terephthalate, the facing surfaces of which had release coatings, to produce a composite. The tubing was partially constricted by a clamp to provide the desired level of pressure in the frother. The composite emerging from the roll coafer was irradiated from both the top and bottom with banks of Sylvania fluorescent black light bulbs, 90% of the emissions of which were between 300 and 400 nm, with a maximum of 351 nm. The composite was successively exposed to the bulbs at an intensity of 2.65 milliWatts/square centimeter (mW/cm$^2$) and a total energy of 165.4 millijoules per square centimeter (mJ/cm$^2$) each from the top and bottom, then likewise to an intensity of 2.70 mW/cm$^2$ and a total energy of 168.5 mJ/cm$^2$, and then likewise to an intensity of 5.90 mW/cm$^2$ and a total energy of 516.8 mJ/cm$^2$. Light measurements were measured in NIST units. The cured core (i.e., Core Layer A) between the release liners had a density of about 0.64 g/cm$^3$.

Example 3

Core Layer B was prepared as described above for Core Layer A except that the processing conditions were varied as follows. The composite was successively exposed to the Sylvania fluorescent black light bulbs at an intensity of 4.3 mW/cm$^2$ for a total energy of 160.7 mJ/cm$^2$ each from the top and bottom, and then an intensity of 5.1 mW/cm$^2$ for a total energy of 892.6 mJ/cm$^2$. The cured core between the release liners had a density of about 0.64 g/cm$^3$.

Example 4

Core Layer C was prepared as described above for Core Layer A except that the pigment was a mixture of 77 parts of a 20% stannous chloride and 80% polyoxypropylenediol, and 23 parts of 20% carbon black in 80% polyoxypropylenediol and the amount of pigment was adjusted to provide a final core color L value of 45. The processing conditions were also varied as follows. The composite was successively exposed to the Sylvania fluorescent black light bulbs at an intensity of 1.25 mW/cm$^2$ for a total energy of 73.5 mJ/cm$^2$ each from the top and bottom, then likewise to an intensity of 1.50 mW/cm$^2$ for a total energy of 88.2 mJ/cm$^2$, and then likewise to an intensity of 4.3 mW/cm$^2$ for a total energy of 353.5 mJ/cm$^2$. The cured core between the release liners had a density of about 0.64 g/cm$^3$.

Example 5

Core Layer D was prepared by laminating two layers of Core C together, 2.0 mm total thickness.

Example 6

Core Layer E was prepared by laminating three layers of Core C together, 3.0 mm total thickness.

Example 7

Core Layer F was prepared by extruding Auto Glass Urethane Windshield Adhesive No. 08693 from a caulk gun onto a silicone release material coated polyester liner and coated into a film 5 mm in thickness.

Examples 8 through 28 describe the preparation of various sealant layers and compositions useful in the invention.

Sealant Layers A through C were extruded onto a polyester carrier film having a double sided silicone release coating, and fed through nip rollers to achieve the desired layer thickness.

Example 8

This example describes the preparation of Sealant Layer A. A 2:1 ratio of Dynapol™ S1402 polyester and Scotchkote™ 215 powder coating resin was melt mixed in a twin screw extruder and calendered to a thickness of 1.5 mm.

Representative extruder operating conditions were: Screw RPM=100, Melt Temp=103.9° C., Zone 1 Temp=81.1° C., Zone 2 Temp=85.5° C. A 45° flow test was performed on 25.4 mm×25.4 mm samples. Test conditions were 177° C. for 12 minutes. Reflow was also done by allowing the samples to cool to room temp for 30 minutes and then placing them in the oven again. Flow was 42 mm. There was no flow after 30 minutes, indicating the formation of a thermoset material.

Example 9

This example describes the preparation of Sealant Layer B. Dynapol™ S1359 polyester (60 parts by volume), and a powder mixture of Epon™ 1001 epoxy resin (10 parts by volume), dicyandiamide (7 parts by volume), and Curezol™ 2MZ-Azine (3 parts by volume) was fed into a twin screw extruder. Epon™ 828 epoxy resin (20 parts by volume) was introduced through an injection port.

Example 10

This example describes the preparation of Sealant Layer C. The preparation for Sealant Layer B was repeated except that an additional 1 part by volume Aerosil™ R972 silica was incorporated into the powder mixture that was fed into the extruder.

Example 11

This example describes the preparation of Sealant Layer D. Dynapol™ S1359 (59 parts), 15 parts Epoxy Resin A, 7 parts dicyandiamide, and 3 parts Curezol™ 2MZ-Azine was fed into a twin screw extruder. 15 parts Epon™ 828 was introduced through an injection port. The resulting extruded Sealant Layer D was calendered to 1.75 mm thickness and wound onto a roll using a Melinex™ 054 polyester film as a carrier.

Example 12

This example describes the preparation of Sealant Layer E. Sealant Layer E was prepared by mixing together 90 parts Dynapol™ S1402, 10 parts Epon™ 1001, 1 part Unilin™ 700 wax, and 0.5 parts of FX-512 (triarylsulfonium salt photoinitiator). This mixture was heated on a hot plate until homogeneous and then pressed into a layer between silicone treated polyester liners. The film was allowed to cool to room temperature and recrystallize.

Example 13

This example describes the preparation of Sealant Layer F. Sealant Layer F was prepared by mixing together 80 grams Dynapol™ S1402, 20 grams Epon™ 1001, 1 gram Unilin™ 700 wax, and 0.5 grams FX-512. This mixture was heated on a hot plate until homogeneous and then pressed into a layer between silicone treated polyester liners. The film was allowed to cool to room temperature and recrystallize.

Example 14

This example describes the preparation of Sealant Layer G. Sealant Layer G was prepared by mixing together 70 parts Dynapol™ S1402, 30 parts Epon™ 1001, 1 part Unilin™ 700 wax, and 0.5 parts of FX-512. This mixture was heated on a hot plate until homogeneous and then pressed into a layer between silicone treated polyester liners. The film was allowed to cool to room temperature and recrystallize.

Example 15

This example describes the preparation of Sealant Layer H. Sealant Layer H was prepared by mixing together 70 parts Dynapol™ S 1402, 30 parts Epoxy Resin A, 1 part Unilin™ 700 wax, and 0.5 parts of FX-512. This mixture was heated on a hot plate until homogeneous and then pressed into a layer between silicone treated polyester liners. The film was allowed to cool to room temperature and recrystallize.

Example 16

This example describes the preparation of Sealant Layer I. Sealant Layer I was prepared by mixing together 70 parts Polyester A, 30 parts Epon™ 1001, 1 part Unilin™ 700 wax, and 0.5 parts of FX-512. This mixture was heated on a hot plate until homogeneous and then pressed into a layer between silicone treated polyester liners. The film was allowed to cool to room temperature and recrystallize.

Example 17

This example describes the preparation of Sealant Layer J. Sealant Layer J was prepared by mixing together 70 parts Dynapol™ S1402, 30 parts Epoxy Resin A, 1 part Unilin™ 700 wax, and 0.1 parts of FX-512. This mixture was heated on a hot plate until homogeneous and then pressed into a layer between silicone treated polyester liners. The film was allowed to cool to room temperature and recrystallize.

Example 18

This example describes the preparation of Sealant Layer K. Sealant Layer K was prepared by mixing together 70 parts Dynapol™ S1402, 30 parts Epoxy Resin A, 1 part Unilin™ 700 wax, and 0.3 parts of FX-512. This mixture was heated on a hot plate until homogeneous and then pressed into a layer between silicone treated polyester liners. The film was allowed to cool to room temperature and recrystallize.

Example 19

This example describes the preparation of Sealant Layer L. Polyester A was heated to 177° C., then pressed into a layer between silicone coated polyester release liners.

Example 20

This example describes the preparation of Sealant Layer M. Polyester A (100 parts) was heated to 177° C. and mixed by hand with 5 parts Cab-O-Sil™ M5 silica. The sample was pressed into a layer between silicone coated polyester release liners.

Example 21

This example describes the preparation of Sealant Layer N. The following formulation was extruded using a Berstorff twin screw extruder fitted with two feeders and a liquid injection port. Cab-O-Sil™ M5 fumed silica was added through one feeder. The other feeder was used to feed the polyester pellets, wax and solid epoxy. The liquid injection port was used to feed the liquid epoxy resin, polyether triol, photocatalyst and sensitizer. The following formulation was used: 50 parts Polyester A, 20 parts Epon™ 1001, 12.5 parts Epon™ 828, 7.5 parts Voranol™ 230–238 polyether triol, 1 part Unilin™ 700, 2 parts SarCat™ CD 1012 photocatalyst, 0.5 parts 1,3-diphenylisobenzofuran, 7 parts Cab-O-Sil™ M5.

The extrudate was fed into a calender nip between two process liners and calendered to a thickness of 1.5 mm. The top side liner was a polycoated silicone paper liner, and the bottom side liner was a green-colored polyethylene liner. Using the liners resulted in a very uniform coating of the sealant between the two liners and also assisted in protecting the sealant from ambient light. The paper liner was stripped off, leaving the green polyethylene liner in place. The use of Polyester A resin significantly simplified the extrusion operation since the fast recrystallization process enhanced the windability and resulted in a tack-free sealant.

Example 22

This example describes the preparation of Sealant Layer O. Polyester A (57 parts), 15 parts Epon™ 1001F, 12.5 parts Epon™ 828, 7.5 parts Voranol™ 230–238, 1 part Unilin™ 700, 5 parts Santicizer™ 278, 2 parts diphenyliodonium hexafluorophosphate, 0.005 parts 1,3-diphenylisobenzofuran, and 3 parts Aerosil™ R972 silica were heated to 127° C. and melt mixed by hand. Samples were pressed into layers between silicone coated polyester release liners.

Example 23

This example describes the preparation of Sealant Layer P. Sealant Layer P was prepared by melt mixing 10 parts Dynapol™ S1402, 10 parts Epon™ 1001, and 4 parts Benzoflex™ S-404 plasticizer. This sample had a much longer recrystallization time than samples not containing the plasticizer. Samples were pressed into layers between silicone coated polyester release liners.

Example 24

This example describes the preparation of Sealant Layers Q through V. Table 1 gives the parts by weight of ingredients used to prepare Sealant Layers Q through V. The components were melt mixed and pressed into layers between silicone coated polyester release liners.

TABLE 1

| Ingredient | Sealant Layer Q | Sealant Layer R | Sealant Layer S | Sealant Layer T | Sealant Layer U | Sealant Layer V |
|---|---|---|---|---|---|---|
| Polyester A | 45 | 45 | 45 | 0 | 0 | 0 |
| Dynapol™ S1402 | 0 | 0 | 0 | 45 | 45 | 45 |
| Synthetic Resin SK | 15 | 0 | 0 | 0 | 0 | 0 |
| Synthetic Resin AP | 0 | 15 | 0 | 15 | 0 | 0 |
| Synthetic Resin CA | 0 | 0 | 15 | 0 | 15 | 0 |
| Synthetic Resin LTH | 0 | 0 | 0 | 0 | 0 | 15 |

Overlap shear adhesion panels were prepared by placing a 12.7 mm by 25.4 mm piece of each sealant layer between an anodized aluminum coupon and a DCT 5000 metal coupon as outlined above in the Overlap Shear test method, and heating on a hot plate to allow the sealant layer to soften. Overlap bonds were made while the sealant was still molten such that an approx. 25 mm by 25 mm sealant layer area was realized. These samples were allowed to cool for 24 hours prior to testing. Table 2 shows overlap shear test results.

TABLE 2

| Ingredient | Sealant Layer Q | Sealant Layer R | Sealant Layer S | Sealant Layer T | Sealant Layer U | Sealant Layer V |
|---|---|---|---|---|---|---|
| Overlap Shear Adhesion (MPa) | 4.62 | 4.04 | 4.75 | 2.10 | 2.37 | 3.43 |
| Failure Mode | AA | AA | AA | AA | AA | AA |

"AA" means adhesive failure at the DCT 5000/sealant layer interface.

Example 25

This example describes the preparation of Sealant Layer W. Sealant Layer W was prepared by melt mixing by hand 45 parts Dynapol™ S1402, 30 parts Dynacoll™ 7130, 20 parts Epon™ 828, 5 parts Voranol™ 230–238, 1 part SarCat™ CD 1012, 0.005 part 1,3-diphenylisobenzofuran, and coating the mixture onto a silicone coated polyester film at 1.0 mm thickness.

Example 26

This example describes the preparation of Sealant Layers X through Z. Table 3 shows the parts by weight of the ingredients used to prepare Sealant Layers X through Z. The components were melt mixed by hand and coated at 1 mm thickness between silicone coated polyester liners.

TABLE 3

| Ingredient | Sealant Layer X | Sealant Layer Y | Sealant Layer Z |
|---|---|---|---|
| Polyester A | 12 | 12 | 12 |
| Epon™ 828 | 4 | 4 | 4 |
| Synthetic Resin CA | 4 | 4 | 4 |
| Metallocene Catalyst A | 0.15 | 0.15 | 0.15 |
| Octaflow™ ST 70 | 0.5 | 0 | 0 |
| Oxymelt™ A-1 | 0 | 1 | 0 |
| Isocryl™ EP550 | 0 | 0 | 2 |

Example 27

This example describes the preparation of Sealant Layer AA. Sealant Layer AA was prepared by melt mixing by hand 12 parts Vitel™ 5833B polyester, 8 parts Epon™ 828, and 0.2 part Metallocene Catalyst A. The mixture was coated at 1.0 mm thickness between silicone coated polyester liners. The layer was laminated to anodized aluminum foil, heated in an oven to 125° C., removed from the oven and immediately photolyzed with a Fusion Systems Processor (Lamp Model i300MB, conveyor model LC-6) at 24.4 meters/minute (total energy was about 103 mjoules), and laminated to Stainguard™ IV and DCT 5000 panels. In both cases adhesive failure at the paint/sealant layer interface was observed.

Example 28

This example describes the preparation of Sealant Layers AB through AH. Table 4 shows the parts by weight of ingredients used to prepare Sealant Layers AB through AH. To prepare the following examples samples were melt mixed by hand to reach a homogeneous mixture. Silica was manually well dispersed in the mixture with a tongue depressor. Samples were cast between silicone treated polyethylene terephthalate liners using spacers to create the desired thickness of 1.0 mm.

TABLE 4

| Formulation | Sealant Layer AB | Sealant Layer AC | Sealant Layer AD | Sealant Layer AE | Sealant Layer AF |
|---|---|---|---|---|---|
| Polyester A | 16 | 16 | 16 | 16 | 20 |
| Vitel™ 5833B | 4 | 4 | 4 | 4 | 0 |
| Synthetic Resin CA | 8 | 8 | 8 | 8 | 8 |
| Dynapol™ S1313 | 4 | 4 | 4 | 4 | 4 |
| Epon™ 828 | 6 | 6 | 6 | 6 | 6 |
| Epon™ SU-8 | 2 | 2 | 2 | 2 | 2 |
| Cab-O-Sil™ M-5 Silica | 2 | 0 | 2 | 2 | 2 |

TABLE 4-continued

| Formulation | Sealant Layer AB | Sealant Layer AC | Sealant Layer AD | Sealant Layer AE | Sealant Layer AF |
|---|---|---|---|---|---|
| 1,12-Dodecanedioic Acid | 0 | 0 | 3 | 6 | 1.5 |
| Metallocene Catalyst A | 0.2 | 0.2 | 0.2 | 0.2 | 0.2 |

The Sealant Layers were evaluated using the 45° Flow Test described above and with the following results:

TABLE 5

| Test Results | Sealant Layer AB | Sealant Layer AC | Sealant Layer AD | Sealant Layer AE | Sealant Layer AF |
|---|---|---|---|---|---|
| 45° Flow Test Results (20 min at 120° C.) | <1 mm | 94 mm | <1 mm | <1 mm | <1 mm |

Example 29

This example illustrates the co-dependence of core and sealant layer thickness on gap filling effectiveness. Sealant Layer AB was prepared at 1.0, 2.0, and 3.0 mm thicknesses as before. Core Layer B was laminated together to prepare 2.0 and 3.0 mm thick core layers. Three sealant thicknesses were then laminated to the three core layer thicknesses. Tape samples were then cut to 10 mm width by 127 mm length.

Glass coupons (5.08 cm by 12.7 cm by 0.394 cm) were primed with a 1 wt. % solution of 3-aminopropyltrimethoxysilane in methanol and allowed to dry at room temperature. Tape samples were then laminated to the primed glass surface. ED 5100 (25.4 mm by 102 mm by 0.89 mm) coupons were laminated together with Bonding Layer A (0.51 mm thickness) to make spacers of various thicknesses and these were attached to a DCT 5002 painted panel (102 mm by 305 mm). The first stack was 5.6 mm, the second stack was 4.0 mm, the third stack was 2.6 mm, and the last stack was 1.8 mm. The spacing between stacks was 10 mm. The panel was then baked for 25 minutes at 140° C. The taped glass coupons were then placed in an oven for approximately 5 minutes at 120° C. The coupons were then exposed to one pass at 16.5 meter/minute on the Fusion Systems Processor. The taped glass, coupon was then pressed onto the stacked panel so that the coupon spanned the gaps, and hand pressure was applied and released, and the sample allowed to cool. The gaps were then inspected to determine if the sealant was able to span the gap and wet-out the painted surface.

The table below shows the results. "C" indicates that a seal was achieved; "I" indicates an incomplete seal. As can be seen, the core layer contributes to sealing efficiency by assisting the sealant layer to reach into gaps that would otherwise require more sealant.

TABLE 6

| Core Thickness | Sealant Thickness | Gap Depth 2.6 mm | Gap Depth 4.0 mm | Gap Depth 5.6 mm |
|---|---|---|---|---|
| 1 mm | 1 mm | C | I | I |
| 2 mm | 1 mm | C | I | I |
| 3 mm | 1 mm | C | I | I |
| 1 mm | 2 mm | C | C | I |
| 2 mm | 2 mm | C | C | I |
| 3 mm | 2 mm | C | C | I |
| 1 mm | 3 mm | C | C | I |
| 2 mm | 3 mm | C | C | C |
| 3 mm | 3 mm | C | C | C |

Example 31

This examples describes a Two Layer Tape Construction A and its use with bracket mounted windows. Bonding Layer A was laminated to the Melinex™ 054 side of 1.0 mm thick Sealant Layer D. The resulting laminate was then cut into a 25.4 mm×50.8 mm strip. The release liner was then removed from the bonding layer side and the tape applied to one side of a piece of plate glass near the edge of the glass. It was then wrapped around the edge of the glass and fastened to the opposite side of the glass so that the Sealant Layer faced out. A metal U-shaped channel bracket was then slid over the tape. There was enough resistance to maintain a snug fit. The assembly was then placed in an oven and baked for 25 minutes at 141° C. The sealant layer had filled the channel encompassing the glass and had filled the bracket volume sufficiently to give a look which closely resembled that for paste adhesive systems.

The strength of the bond between the metal and the glass was tested using the Tensile and Elongation Test after periods up to 14 days at 70° C., or alternatively at 37.8° C. and 100% relative humidity, and resulted in fracture of the glass. Delamination or adhesive failure at either substrate was not observed.

Example 31

This examples describes the preparation of a Two Layer Tape Construction B. Sealant Layer W was laminated to Core Layer D which had been primed with Primer Composition A using a #5 Meyer (wire wound) rod. The primer was allowed to dry for about 5 minutes prior to laminating it to the core layer. The resulting laminate was then slit into 12.7 mm wide strips.

The frit surface of a piece of a 1985 Buick Somerset quarter window glass, was primed with a solution of Primer Composition A with 2 wt. % 3-aminopropyltrimethoxysilane added thereto. This solution was then brushed onto the frit bonding surface of the glass and allowed to air dry at room temperature. The foam core layer side of the tape construction was then laminated to the glass using a scarf joint to butt the ends of the tape together encircling the circumference of the part.

The resultant assembly was then packaged by using an overhanging liner composed of 76.2 mm wide labeling tape which had a liner layer of green polyethylene laminated to it. The tape was applied over the taped surface by having the liner serve as a light protector for the sealant and overhanging the tacky labeling tape so that it bonded along the surface edge of the tape. A quartz IR lamp was used to heat the surface of the tape. It took approximately 2 minutes in order for this light system to heat the tape to 80° C. Next the taped glass assembly was exposed to a super diazo blue lamp (Black Ray Lamp Model No. XX-15L, from UVP Inc., San Gabriel, Calif., equipped with two bulbs, Model TLD15W/

03 from Philips B.V., The Netherlands) for 25 seconds (total energy was approx. 137 mJoules), and then installed in a painted metal cut-out. Good flow occurred. The sealant was able to flow through the weld spot burn holes and mushroom on the opposite side forming a good seal.

Example 32

These examples describe the preparation of Two Layer Tape Constructions C through E. Sealant Layers X through Z were laminated to Core Layer C (primed with Primer Composition A), and the core layers were then laminated to anodized aluminum foil. The sealant layer was then exposed to UV light from a Fusion Systems Processor (total energy was approx. 137 mjoules) and applied to DCT 5000 painted metal coupons at room temperature and refrigerated panels. Samples were aged overnight and pulled apart by hand followed by scraping with a spatula to try to force an adhesive failure.

TABLE 7

| 2 Layer Tape Construction | Sealant Layer Used | Refrigerated First Pull | Refrigerated Scraping | Room Temperature First Pull | Room Temperature Scraping |
|---|---|---|---|---|---|
| C | X | AD | AD | AD | AD |
| D | Y | FS | Coh | FS | Coh |
| E | Z | FS | Cob/AD | FS | Coh/AD |

In Table 7, "FS" means that the foam core layer split (core layer cohesive failure); "AD" means adhesive failure at the sealant layer/paint layer interface; "Coh" means cohesive failure of the sealant layer.

Example 33

This example describes the preparation of Two Layer Tape Construction F. As a comparative example, Hydrosil™ 2627 glass primer was applied to a 50.7 mm×100.1 mm piece of glass. A 6.3 mm diameter bead of Auto Glass Urethane Windshield Adhesive No. 08693 was applied to the glass and the assembly was laminated to a DCT 5002 painted metal coupon.

According to the invention, Core Layer E was applied to a separate piece of glass primed as above. A 6.3 mm bead of Auto Glass Urethane Windshield Adhesive No. 08693 was then applied to the foam core layer, and the assembly applied to the painted metal coupon as before.

In both cases, sufficient pressure was applied to each sample to squeeze the urethane out against the metal panel. After 1 week the samples were inspected, and it was apparent that each construction was firmly bonded to the panel; however, in the case of the sample with Core Layer E, the glass had an increased ability to move relative to the metal coupon without bond failure.

Example 34

This example describes the preparation of Three Layer Tape Construction A having a polyester tie layer and its use to bond glass to metal. Core Layer A was laminated to the polyester side of Sealant Layer D. On the opposite face of core layer A, a 0.25 mm thick layer of bonding layer A was laminated. The laminate was cut into a strip 19 mm wide and 100 mm long, and the bonding layer was laminated to 4 mm thick plate glass. A 25.4 mm×100.2 mm E-coated metal coupon was laid over the top of the sealant layer. Spring clips were used to secure the ends of the E-coated coupon to the glass plate creating a normal force that was meant to simulate the weight of a windshield. A 25.4 mm×50.8 mm anodized aluminum coupon was laid over the opposite edge of the sealant layer and the sample placed in an oven for 25 minutes at 177° C. Upon removal from the oven, Bonding Layer A had changed color indicating that the tape had achieved a thermoset state. Flow of the sealant layer and formation of a bond to the coupon was observed in both cases.

When the anodized panel was deformed a significant amount of acrylic foam core deformation occurred in the direction perpendicular to the coupon, and the assembly remained intact.

Example 35

This example describes the preparation of Three Layer Tape Construction B having a polyester tie layer and its use with bracket mounted windows. A 30 mil thick layer of Bonding Layer A was hand laminated to Core Layer B. Sealant Layer F was laminated onto the opposite face of the Core Layer B.

A sample strip 25.4 mm by 76.2 mm was cut from the composite laminate and the bonding layer was laminated to a 50.8 mm×127 mm piece of flat plate glass. This assembly was then placed in a forced air convection oven at 140° C. for 20 minutes with the tape facing up. After baking it was observed that the bonding layer had changed appearance and was now a mottled gray in appearance and the sealant had softened/melted and was translucent in appearance. The sealing layer did not run out and over the edge of the tape which would have resulted in encapsulation of the bonding and foam layers of the tape. Upon cooling the sealant resolidified to a tack free state.

The assembly was then aged overnight and the next day the sample was exposed to 5 minutes of low intensity UV radiation at a distance of approximately 25.4 mm. After the exposure, a heat gun was used to heat the tape. During the heating the sealant mass was observed to go translucent and glossy in appearance which indicates softening of the sealer mass. A 25.4 mm×100.2 mm painted (DCT 5002) piece of steel was bent into an inverted 'U' shape with a channel depth of approximately 3 mm. This was pressed, with hand pressure, onto the softened sealer mass along its length to try to simulate the sealer's ability fill gaps which are of greater depth than the thickness of the sealer layer itself. Visually, one could see that the sealant layer had effectively flowed toward the channel cavity and was able to make contact with the deepest part of the metal panel.

During the flow and bonding process, the sealant was observed to wet-out the entire face of the painted surface and then when hand pressure was released, the sealer necked in from the edge creating a slight cavity. To test whether this cavity was sealed, water was poured into the cavity. It was determined that an effective seal had been achieved by the fact that the water was retained in the cavity.

Example 36

This example describes the preparation of Three Layer Tape Construction C having a polyester tie layer and its use with bracket mounted windows. Tape Construction C was prepared by laminating Core Layer B to Sealant Layer E. On the opposite face of Core Layer B was laminated Bonding Layer A. The laminate was cut into a strip 12.7 mm×25.4 mm, and the bonding layer was laminated to 4 mm thick plate glass. The sealant layer of the laminate was then exposed to UV radiation for 5 minutes using the Sylvania fluorescent black light bulbs described in conjunction with Example 2 at an approximate distance of 10 cm. The laminate was then placed onto a DCT 5002 painted metal panel so that the sealant layer was on top of and in contact with the panel. The sample was placed in an oven for 20 minutes at 141° C.

The strength of the bond between the metal and the glass was tested using the Tensile and Elongation Test after periods up to 20 days at 70° C. or, alternatively, at 37.8° C. and 100% relative humidity, and resulted in fracture of the core layer. Delamination or adhesive failure at either substrate was not observed.

Example 37

This example illustrates Three Layer Tape Construction D having a polyester tie layer and its use with bracket mounted windows. Tape Construction D was prepared by laminating Core Layer B to Sealant Layer F. On the opposite face of Core Layer B was laminated Bonding Layer A. The laminate was cut into a strip 12.7 mm×25.4 mm, and the bonding layer was laminated to 4 mm thick plate glass. The sealant layer of the laminate was then exposed to UV radiation for 5 minutes using the Sylvania fluorescent black light bulbs described in conjunction with Example 2 at an approximate distance of 10 cm. The laminate was then placed onto a DCT 5002 metal panel so that the sealant layer was on top of and in contact with the panel. The sample was placed in an oven for 20 minutes at 141° C.

The strength of bond between the metal and the glass was tested using the Tensile and Elongation Test after periods up to 20 days at 70° C. or alternatively at 37.8° C. and 100% relative humidity, and resulted in fracture of the core layer. Delamination or adhesive failure at either substrate was not observed.

Example 38

This example describes the preparation of Three Layer Tape Construction E having a polyester tie layer and its use with bracket mounted windows. Tape Construction E was prepared by laminating Core Layer C to Sealant Layer G. On the opposite face of Core Layer C was laminated Bonding Layer A. The laminate was cut into a strip 12.7 mm×25.4 mm, and the bonding layer was laminated to 4 mm thick plate glass. The sealant layer of the laminate was then exposed to UV radiation for 5 minutes using the Sylvania fluorescent black light bulbs described in conjunction with Example 2 at an approximate distance of 10 cm. The laminate was then placed onto a DCT 5002 metal panel so that the sealant layer was on top of and in contact with the panel. The sample was placed in an oven for 20 minutes at 141° C.

The strength of bond between the metal and the glass was tested using the Tensile and Elongation Test after periods up to 20 days at 70° C. or alternatively at 37.8° C. and 100% relative humidity, and resulted in fracture of the core layer. Delamination or adhesive failure at either substrate was not observed.

Example 39

This example describes the preparation of Three Layer Tape Construction F having a polyester tie layer and its use with bracket mounted windows. Tape Construction F was prepared by laminating Core Layer B to Sealant Layer H. On the opposite face of Core Layer B was laminated Bonding Layer A. The laminate was cut into a strip 12.7 mm by 25.4 mm, and the bonding layer was laminated to 4 mm thick plate glass. The sealant layer of the laminate was then exposed to UV radiation for 5 minutes using the Sylvania fluorescent black light bulbs described in conjunction with Example 2 at an approximate distance of 10 cm. The laminate was then placed onto a DCT 5002 metal panel so that the sealant layer was on top of and in contact with the panel. The sample was placed in an oven for 20 minutes at 141° C.

The strength of bond between the metal and the glass was tested using the Tensile and Elongation Test after periods up to 20 days at 70° C. or alternatively at 37.8° C. and 100% relative humidity, and resulted in fracture of the core layer. Delamination or adhesive failure at either substrate was not observed.

Example 40

This example describes the preparation of Three Layer Tape Construction G having a polyester tie layer and its use with bracket mounted windows. Tape Construction G was prepared by laminating Core Layer B to Sealant Layer I. On the opposite face of Core Layer B was laminated Bonding Layer A. The laminate was cut into a strip 12.7 mm by 25.4 mm, and the bonding layer was laminated to 4 mm thick plate glass. The sealant layer of the laminate was then exposed to UV radiation for 5 minutes using the Sylvania fluorescent black light bulbs described in conjunction with Example 2 at an approximate distance of 10 cm. The laminate was then placed onto a DCT 5002 metal panel so that the sealant layer was on top of and in contact with the panel. The sample was placed in an oven for 20 minutes at 141° C.

The strength of bond between the metal and the glass was tested using the Tensile and Elongation Test after periods up to 20 days at 70° C. or, alternatively, at 37.8° C. and 100% relative humidity, and resulted in fracture of the core layer. Delamination or adhesive failure at either substrate was not observed.

Example 41

This example describes the preparation of Three Layer Tape Construction having a polyester tie layer and its use with bracket mounted windows. Tape Construction H was prepared by laminating Core Layer B to Sealant Layer J. On the opposite face of Core Layer B was laminated Bonding Layer A. The laminate was cut into a strip 12.7 mm by 25.4 mm, and the bonding layer was laminated to 4 mm thick plate glass. The sealant layer of the laminate was then exposed to UV radiation for 5 minutes using the Sylvania fluorescent black light bulbs described in conjunction with Example 2 at an approximate distance of 10 cm. The laminate was then placed onto a DCT 5002 painted metal panel so that the sealant layer was on top of and in contact with the panel. The sample was placed in an oven for 20 minutes at 141° C. The strength of bond between the metal and the glass was tested using the Tensile and Elongation Test after periods up to 20 days at 70° C. or, alternatively, at 37.8° C. and 100% relative humidity, and resulted in fracture of the core layer. Delamination or adhesive failure at either substrate was not observed.

Example 42

This example describes the preparation of Three Layer Tape Construction I and its use to bond glass to metal. Tape Construction I was prepared by laminating Core Layer B to Sealant Layer K. On the opposite face of Core Layer B was laminated Bonding Layer A. The laminate was cut into a strip 12.7 mm by 25.4 mm, and the bonding layer was laminated to 4 mm thick plate glass. The sealant layer of the laminate was then exposed to UV radiation for 5 minutes using the Sylvania fluorescent black light bulbs described in conjunction with Example 2 at an approximate distance of 10 cm. The laminate was then placed onto a DCT 5002 metal panel so that the sealant layer was on top of and in contact with the panel. The sample was placed in an oven for 20 minutes at 141° C.

The strength of bond between the metal and the glass was tested using the Tensile and Elongation Test after periods up to 20 days at 70° C. or, alternatively, at 37.8° C. and 100% relative humidity, and resulted in fracture of the core layer. Delamination or adhesive failure at either substrate was not observed.

Example 43

This example describes the preparation of Three Layer Tape Construction J. Sealant Layer L was laminated to itself to a thickness of 4 plies to achieve a final thickness of approximately 4.0 mm. The 4 ply laminated samples were then further laminated to a 1.0 mm thick piece of Core Layer B and then Bonding Layer A was laminated to the opposite face of the acrylic foam. Multiple samples were then cut 25.4 mm by 12.7 mm and horizontally laminated to a piece of plate glass at one edge. The glass was then racked in a vertical fashion with the tapes on the upper edge and placed in an oven set at 141° C. for 25 minutes. Upon removal from the oven, the entire sealant layer had flowed.

Example 44

This example describes the preparation of Three Layer Tape Construction K. Sealant Layer M was laminated to itself to a thickness of 4 plies to achieve a final thickness of approximately 4.0 mm. The 4 ply laminated samples were then further laminated to a 1.0 mm thick piece of Core Layer B and then Bonding Layer A was laminated to the opposite face of the acrylic foam. Multiple samples were then cut 25.4 mm by 12.7 mm and horizontally laminated to a piece of plate glass at one edge. The glass was then racked in a vertical fashion with the tape on the upper edge and placed in an oven set at 141° C. for 25 minutes. Upon removal from the oven, the sealant layer had flowed approximately 25.4 mm down the face of the glass panel.

Example 45

This example describes the preparation of Three Layer Tape Construction L. Sealant Layer N was laminated to itself to a thickness of 4 plies to achieve a final thickness of approximately 4.0 mm. The 4 ply laminated samples were then further laminated to a 1.0 mm thick piece of Core Layer B and then Bonding Layer A was laminated to the opposite face of the acrylic foam. Multiple samples were then cut 25.4 mm by 12.7 mm and horizontally laminated to a piece of plate glass at one edge. The glass was then racked in a vertical fashion with the tape on the upper edge and placed in an oven set at 141° C. for 25 minutes. Upon removal from the oven, no flow of the sealant layer was observed and the sealant still had square edges. After cooling the material was then reheated for 5 minutes at 141° C., taken from the oven and a 25.4 mm by 100.2 mm E-coated metal coupon with a 0.63 mm hole cutout was pressed against the 10% silica containing sealant. The sealant was observed to easily flow out and around the coupon, into the hole and swelled on the back side to physically lock the coupon to the sealant. The sealant cooled quickly and recrystallized to form a strong bond/seal.

Example 46

This example describes the preparation of Three Layer Tape Construction M. Bonding Layer A was laminated to a 3.0 mm thickness Core Layer E laminated in turn to a 1.5 mm thick Sealant Layer O.

Example 47

This example describes a glass window installation according to the invention. Glass and a metal cut-out were obtained from a 1985 Buick Somerset quarter window (believed to be encapsulated with polyvinyl chloride (PVC)). Both surfaces were cleaned and the metal repainted prior to use with a conventional automotive repair paint. Three Layer Tape Construction M was converted into strips which were approximately 12.7 mm wide. The bonding layer of the tape was bonded to the perimeter of the glass at room temperature conditions, followed by heating with a quartz infrared lamp to activate the bonding layer. During the process the PVC encapsulant began to smoke. The sample was allowed to cool and the tape was reheated by exposing the sealant face to the infrared radiation. After it was softened, the laminated construction was exposed to 10 seconds of light using the super diazo blue lamp described in conjunction with Example 31; the exposure was (approximately 110 mjoules/cm$^2$). The sample was then quickly installed into the metal cutout by applying uniform pressure to the face of the glass.

Example 48

This example describes another glass window installation according to the invention. Similar to Example 47, the glass was preheated with infrared radiation to approx. 82.2° C. Three Layer Tape Construction M was easily applied to the perimeter of the glass. The ends were lapped side by side for approximately 76.2 mm to effect a seal. Additional infrared heat was applied to the back side (through the glass). After approximately 20 minutes the sample was allowed to cool. The sealant layer was reheated with infrared, then exposed to light using the super diazo blue lamp described in conjunction with Example 31 and installed into the metal cut out effecting a good seal.

Example 49

This example describes metal to glass sealing using a 3 Layer Tape Construction. Bonding Layer A was laminated to one surface of Core Layer F, the sample was slit to a width of 12.7 mm, and the strip was laminated to a glass substrate and placed in an oven for 25 minutes at 140° C. After removing the sample from the oven and allowing it to cool to room temperature, a 10 mm diameter bead of Auto Glass Urethane Windshield Adhesive No. 08693 was applied to Core Layer F and the resulting assembly was laminated to a DCT 5002 metal panel with sufficient pressure to squeeze the sealant out against the surface. The film was allowed to cure overnight under ambient conditions, thereby creating a good seal.

Example 50

This example describes metal to glass sealing using a 3 Layer Tape Construction. The procedure of Example 49 was repeated except that Sealant Layer AB was used instead of the urethane paste. Thus, Sealant Layer AB was laminated on the surface of the Core Layer F and the assembly was heated to 120° C. for approximately 5 minutes. The sample was then exposed to one pass at 16.5 meter/minute using the Fusion Systems Processor. The sample was then placed on a DCT 5002 metal panel and sufficient pressure applied to insure good wet-out.

Example 51

This example describes metal to glass sealing using a 3 Layer Tape Construction. In this example, Bonding Layer A was applied in the form of a 25.4 mm wide tape around the perimeter of a 102 mm by 203 mm piece of glass. The taped glass was cured for 25 minutes at 140° C.

Sealant Layer AF was laminated to a two ply laminate of Core Layer B (2 mm thickness) and slit to 12.7mm width. This strip was then laminated to the cured Bonding Layer A. A tenacious bond was observed between the cured bonding layer and the core layer. A scarf joint was used to attach the two ends after encircling the perimeter of the glass. This assembly was then heated to 120° C. for approximately 5 minutes and exposed at 16.5 meter/minute using the Fusion Systems Processor. The assembly was then laminated to a DCT 5002 metal panel to produce a good seal.

Example 52

This example describes metal to glass sealing using a 3 Layer Tape Construction. In this example, Bonding Layer A was laminated to a two ply laminate of Core Layer B (2 mm thickness) and slit to form a 12.7 mm width tape. The Bonding Layer A side of the tape was laminated to the perimeter of an isopropanol-cleaned, 102 mm by 203 mm piece of glass. A scarf joint was used to butt the two ends together and the sample was baked for 25 minutes at 140° C. The sample was allowed to cool. After cooling, Sealant Layer AB (12.7 mm width) was laminated to the core layer and the two ends were butted together. This assembly was then heated for approximately 5 minutes at 120° C. and exposed at 16.5 meter/minute using the Fusion Systems Processor. The assembly was then laminated to a DCT 5002 metal panel to create a good seal.

Other embodiments are within the following claims. While the invention has been described with reference to the particular embodiments and drawings set forth above, the spirit of the invention is not so limited and is defined by the appended claims.

What is claimed is:

1. A sealant composition comprising a blend of an epoxy resin, a semi-crystalline polyester, and a curing agent selected from the group consisting of (a) thermally activated curing agents characterized by a thermal activation temperature and (b) photo-active curing agents characterized by a thermal decomposition temperature, said sealant composition characterized in that prior to cure, said composition substantially retains its shape when heated to a temperature greater than the melting temperature of said polyester but less than (a) the thermal activation temperature of said curing agent, where said curing agent is a thermally activated curing agent or (b) the thermal decomposition temperature of said curing agent, where said curing agent is a photo-active curing agent, until acted upon by an external force other than gravity.

2. A sealant composition according to claim 1 wherein said sealant composition further comprises a thixotropic agent.

3. A sealant composition according to claim 2 wherein said thixotropic agent is selected from the group consisting of particles, chopped fibers, bubbles, beads and combinations thereof.

4. A sealant composition according to claim 2 wherein said thixotropic agent comprises silica particles.

5. A sealant composition according to claim 1 wherein said curing agent comprises a photo-active curing agent.

6. A sealant composition according to claim 1 wherein said curing agent comprises a thermally activated curing agent.

7. A sealant composition according to claim 1 wherein prior to cure, said composition substantially retains its shape when heated to a temperature greater than the melting temperature of said polyester, but less than about 200° C., until acted upon by an external force other than gravity.

* * * * *

UNITED STATES PATENT AND TRADEMARK OFFICE
CERTIFICATE OF CORRECTION

PATENT NO. : 6,372,827 B2
DATED : April 16, 2002
INVENTOR(S) : Michael A. Johnson et al.

It is certified that error appears in the above-identified patent and that said Letters Patent is hereby corrected as shown below:

<u>Column 11,</u>
Line 9, "ajaw" should read -- a jaw --.

<u>Column 13,</u>
Line 46, "ERL4221" should read -- ERL-4221 --.

<u>Column 14,</u>
Line 42, "thernally" should read -- thermally --.
Line 55, insert -- . -- after "thereof".

<u>Column 16,</u>
Line 30, "Theological" should read -- rheological --.
Lines 43 and 45, insert -- . -- after "thereof"

<u>Column 19,</u>
Line 55, delete "$_5$b/o" and insert therefore -- 5% --.

<u>Column 21,</u>
Line 30, delete "." following "stress".

<u>Column 23,</u>
Line 60, "Htils" should read -- Hüls --.
Line 64, "9B1 17" should read -- 9B117 --.

<u>Column 25,</u>
Line 39, "9B1117" should read -- 9B117 --.

<u>Column 31,</u>
Line 48, delete "," after "glass".

UNITED STATES PATENT AND TRADEMARK OFFICE
CERTIFICATE OF CORRECTION

PATENT NO.    : 6,372,827 B2
DATED         : April 16, 2002
INVENTOR(S)   : Michael A. Johnson et al.

It is certified that error appears in the above-identified patent and that said Letters Patent is hereby corrected as shown below:

<u>Column 40,</u>
Line 30, delete "2" and insert therefor -- 3 --.

Signed and Sealed this

Thirtieth Day of December, 2003

JAMES E. ROGAN
*Director of the United States Patent and Trademark Office*